(12) United States Patent
Herdy, Jr. et al.

(10) Patent No.: US 12,121,889 B2
(45) Date of Patent: Oct. 22, 2024

(54) VARIABLE THREE DIMENSIONAL CONVERGENT-DIVERGENT NOZZLE

(71) Applicants: CFD RESEARCH CORPORATION, Huntsville, AL (US); Garry Lynn Freeman, Jr., Huntsville, AL (US)

(72) Inventors: Joseph Roger Herdy, Jr., Huntsville, AL (US); Garry Lynn Freeman, Jr., Huntsville, AL (US)

(73) Assignees: CFD RESEARCH CORPORATION, Huntsville, AL (US); Garry Lynn Freeman, Jr., Huntsville, AL (US)

( * ) Notice: Subject to any disclaimer, the term of this patent is extended or adjusted under 35 U.S.C. 154(b) by 155 days.

(21) Appl. No.: 17/502,517

(22) Filed: Oct. 15, 2021

(65) Prior Publication Data

US 2022/0120237 A1    Apr. 21, 2022

Related U.S. Application Data

(60) Provisional application No. 63/092,280, filed on Oct. 15, 2020.

(51) Int. Cl.
*G01M 9/04* (2006.01)
*B01J 4/00* (2006.01)
(Continued)

(52) U.S. Cl.
CPC .......... *B01J 4/002* (2013.01); *B01J 6/00* (2013.01); *C01B 13/0203* (2013.01);
(Continued)

(58) Field of Classification Search
CPC ........ B01J 4/002; B01J 6/00; B01J 2204/007; B01J 19/0006; B01J 19/0033; B01J 19/26; C01B 13/0203; C01B 21/02; G01M 9/04
See application file for complete search history.

(56) References Cited

U.S. PATENT DOCUMENTS

| | | | | |
|---|---|---|---|---|
| 2,933,922 A | * | 4/1960 | Davis | G01M 9/04 73/147 |
| 3,045,705 A | * | 7/1962 | Hausammann | G01M 9/04 239/455 |

(Continued)

FOREIGN PATENT DOCUMENTS

WO    2020210179 A1    10/2020

OTHER PUBLICATIONS

Arnold Engineering Development Center; "The von Karman Gas Dynamics Facility Wind Tunnels"; published in Release 2002-202; 2002; https://engineering.purdue.edu; Hypersonic-news; 2 pages.
(Continued)

*Primary Examiner* — Freddie Kirkland, III
(74) *Attorney, Agent, or Firm* — MASCHOFF BRENNAN

(57) ABSTRACT

A variable 3D CD nozzle includes: a flexible body defining a flow path having an inlet extending through a narrowed throat to an expanded outlet, wherein the flexible body comprises a plurality of flexible members movably interconnected together; and at least one means for changing a shape of the flexible body to change a dimension or location of the throat plane relative to at least one of the inlet plane or outlet plane. A method of changing airflow in a nozzle includes operating at least one means for changing the shape of the flexible nozzle body to change the dimension or the location of the throat plane. A method of testing an object includes placing a test object in the test region of the test cell and passing a test gas from the outlet opening of the nozzle onto the test object.

31 Claims, 16 Drawing Sheets

(51) Int. Cl.
   *B01J 6/00* (2006.01)
   *C01B 13/02* (2006.01)
   *C01B 21/02* (2006.01)

(52) U.S. Cl.
   CPC .............. *C01B 21/02* (2013.01); *G01M 9/04* (2013.01); *B01J 2204/007* (2013.01)

(56) References Cited

U.S. PATENT DOCUMENTS

| | | | | |
|---|---|---|---|---|
| 3,104,680 A * | 9/1963 | Orlin | ................ | G01M 9/04 239/455 |
| 3,534,908 A * | 10/1970 | Holland | ................ | F02K 9/86 60/264 |
| 3,744,305 A * | 7/1973 | Sabol | ................ | G01M 9/04 73/147 |
| 5,099,685 A * | 3/1992 | McLean | ................ | G01M 9/04 73/147 |
| 6,606,851 B1 | 8/2003 | Herdy, Jr. et al. | | |
| 6,779,335 B2 | 8/2004 | Herdy, Jr. | | |
| 7,568,348 B2 * | 8/2009 | McAllister | ................ | F02K 9/90 60/770 |
| 7,762,078 B2 * | 7/2010 | Lynch | ................ | F02K 9/978 239/265.19 |
| 8,459,036 B2 | 6/2013 | Baker | | |
| 8,651,142 B2 * | 2/2014 | Sellers | ................ | F03G 7/065 60/770 |
| 9,470,603 B2 | 10/2016 | Cox et al. | | |
| 9,598,323 B2 | 3/2017 | Sackheim et al. | | |
| 9,976,515 B2 * | 5/2018 | Akatsuka | ................ | F02K 1/46 |
| 10,288,520 B1 * | 5/2019 | Miller | ................ | G01M 15/14 |
| 10,371,093 B2 * | 8/2019 | Baker | ................ | F02K 1/15 |
| 10,436,148 B2 * | 10/2019 | Hussain | ................ | F02K 1/06 |
| 10,738,735 B2 | 8/2020 | Todorovic | | |
| 2003/0056580 A1 * | 3/2003 | Sawada | ................ | G01M 9/04 73/147 |
| 2007/0256419 A1 * | 11/2007 | Baker | ................ | F02K 1/16 60/771 |
| 2015/0048177 A1 * | 2/2015 | Akatsuka | ................ | F02K 1/46 239/11 |
| 2015/0308922 A1 * | 10/2015 | Cox | ................ | G01M 9/04 73/147 |
| 2022/0119256 A1 * | 4/2022 | Herdy, Jr. | ................ | B01J 19/26 |

OTHER PUBLICATIONS

Arnold Engineering Development Center; "Hypersonic Wind Tunnels"; published in Release 2003-079; 2003; https://engineering.purdue.edu; Hypersonic-news; 5 pages.

Karabeyoglu et al.; "Modeling of N2O Decompositions Events"; 44th AIAA/ASME/SAE/ASEE Joint Propulsion Conference & Exhibit, Joint Propulsion Conferences; Jul. 23, 2008; https://doi.org/10.2514/6.2008-4933; 30 pages.

* cited by examiner

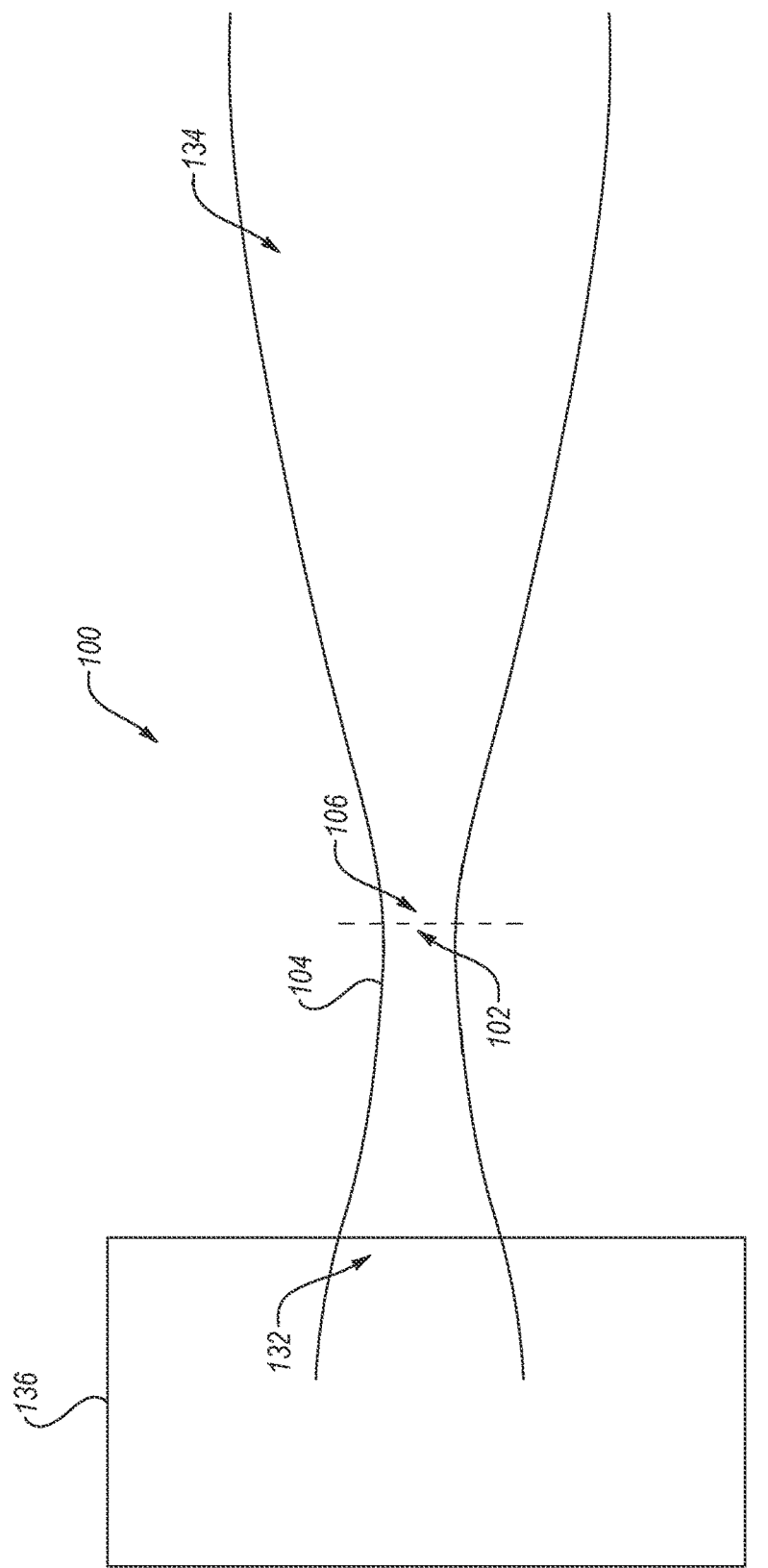

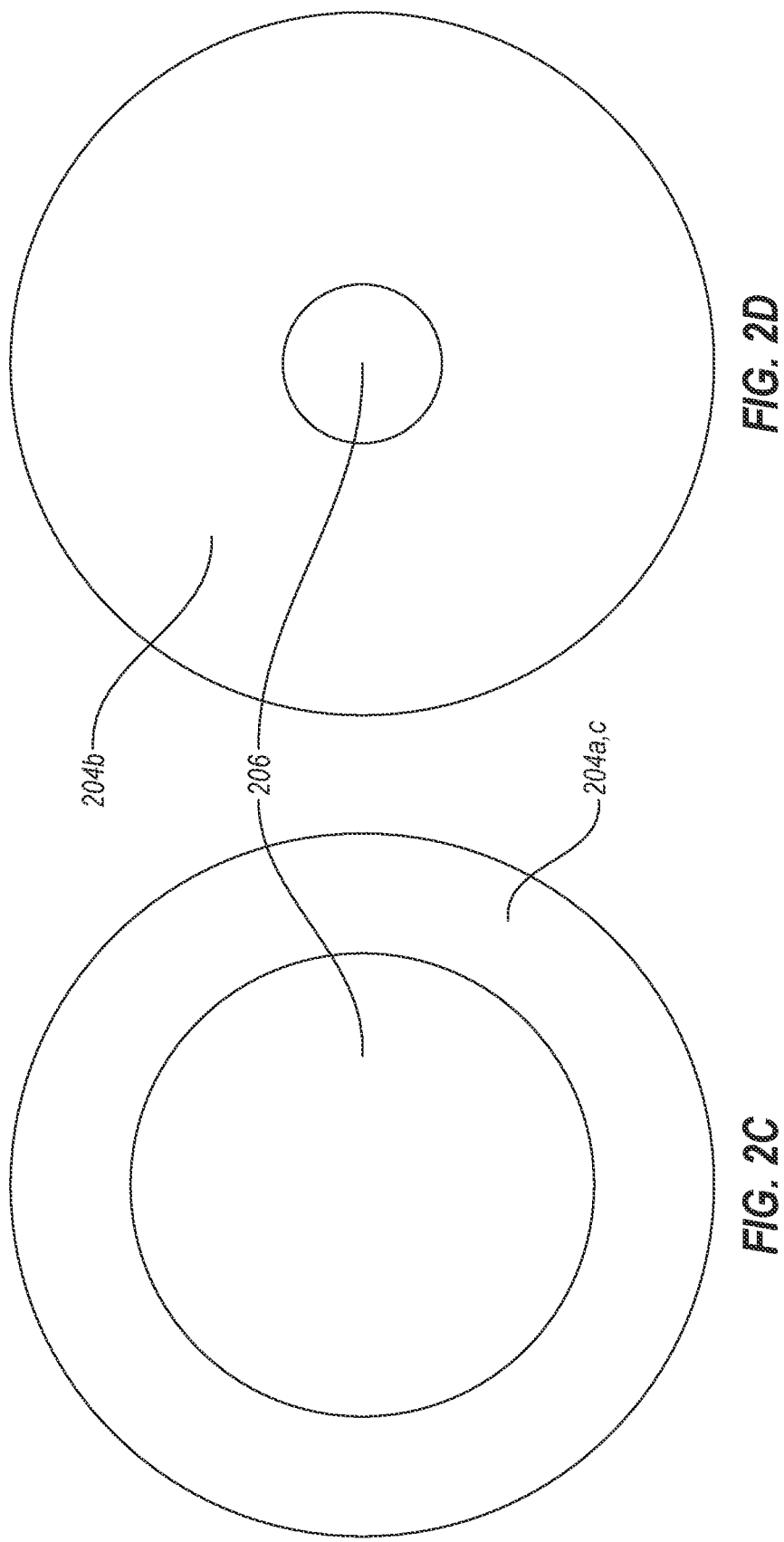

VARIABLE THREE DIMENSIONAL CONVERGENT-DIVERGENT NOZZLE

CROSS-REFERENCE TO RELATED APPLICATIONS

This patent application claims priority to U.S. Provisional Application No. 63/092,280 filed Oct. 15, 2020, which provisional is incorporated herein by specific reference in its entirety.

U.S. GOVERNMENT RIGHTS

This invention was made with government support under W9124P-19-9-0001 awarded by the Aviation & Missile Technology Consortium (AMTC), and under AMTC-23-07-001 awarded by the Other Transactional Authority (OTA). The government has certain rights in the invention.

BACKGROUND

Field

The present disclosure relates to a variable three dimensional (3D) convergent-divergent (CD) nozzle, which is also known as a de Laval nozzle. The variable CD nozzle can be configured for use in any nozzle application that uses convergence and divergence of gas flow, such as a wind tunnel system.

Description of Related Art

Previously, convergent-divergent (CD) nozzles (e.g., de Laval nozzles) have been prepared in fixed shapes with a defined 3D profile from inlet to outlet, to provide for a convergent inlet region to a throat with a divergent outlet region. The fixed shapes result in fixed area ratio Mach numbers associated with the throat region choked gas flow rates. There has been a desire to have a variable CD nozzle to be able to change the Mach number. Changing the Mach number in a testing facility can allow for collection of data over a range of Mach numbers. However, there is no feasible means for changing the three-dimensional (3D) shape of the CD nozzle, other than physically switching out different CD nozzles that have different dimensions and shapes. Such a physical change of CD nozzles would be time consuming and costly, which are unfavorable.

The CD nozzle has been used to meter both the flow rate from the area of the nozzle throat and to create a specific exit and downstream Mach number. This can be from the area ratio of the nozzle outlet plane 14 to the nozzle throat area 12 of the CD nozzle 10, see FIG. 1. CD nozzles are generally made by machining a converging/diverging shape inside of a cylinder, usually with a corresponding exterior machining to reduce material weight for handling purposes. This results in a fixed shape, and thereby the ability to change the shape is not trivial. Usually, different CD nozzles have to be exchanged to achieve different Mach numbers.

There have been two dimensional (2D) variable CD nozzles that have been designed and utilized, but lack the third dimension that occurs in real space. As such, the 2D variable CD nozzles do not provide an accurate representation of the real world environment. In part, this is because only two opposing top and bottom planes were movable (Ref: Arnold Engineering Development Complex, Arnold Air Force Base, Tennessee (AEDC), von Karman Gas Dynamics Facility, for example see engineering.purdue.edu/~aae519/hypersonics-news/AEDC-VKF.pdf). This approach has also been typically used with metal plates driven by actuators to result in contoured surfaces that effectively results in the ability to set the nozzle throat area and exit plane area, but only adjustable in the narrowing or expanding of the cross-dimension (e.g., height) in one direction. The large area ratios required for hypersonic velocities lead to very small nozzle throats and widely flaring nozzle walls downstream.

Various configurations for changing an airflow profile in nozzle have been attempted, such as in U.S. Pat. Nos. 8,459,036; 9,470,603; and 10,738,735. However, none of these configurations allow for changing the shape of the CD nozzle in a symmetric matter that accurately models 3D airflow. The '603 patent teaches a flexible fiber-reinforced composite that is morphable in shape but not size, and it only changes the shape of the throat area in a way that is not axisymmetric.

Current high speed/hypersonic (HS/H) device test systems can be expensive to operate and produce improper test conditions that are not commensurate with actual conditions experienced by an HS/H device. The improper test conditions can lead to errors in the design of HS/H devices. There are challenges with providing test conditions that are commensurate with actual flight conditions experienced by an HS/H device.

Thus, there is a need for a variable three dimensional (3D) convergent-divergent (CD) nozzle that can be axisymmetric when varied in dimension and shape to provide a range of achievable Mach numbers to provide realistic testing conditions.

SUMMARY

In some embodiments, a variable three dimensional (3D) convergent-divergent (CD) nozzle can include: a flexible nozzle body defining a flow path having an inlet opening with an inlet plane extending through a narrowed throat with a throat plane to an expanded outlet opening with an outlet plane, wherein the flexible nozzle body comprises a plurality of flexible members (e.g., nozzle body members) movably interconnected together; and at least one means for changing a shape of the flexible nozzle body to change a dimension/area or location of the throat plane relative to at least one of the inlet plane or outlet plane. In some aspects, the plurality of flexible members are movably interconnected together by a movable interlace, interweave, intertwine, plait, entwine, cross-cross, weave, knit, lace twist, wind or other association thereof to form the flexible body. In some aspects, the plurality of flexible members include cord, thread, string, strap, tape, line, rope, cable, wire, ligature, twine, yarn, ribbon, strip, fiber, filament, petal, sheet, or combinations thereof or interlace, interweave, intertwine, plait, entwine, cross-cross, weave, knit, lace twist, or wind thereof for each flexible member. In some aspects, the flexible body includes apertures between the plurality of flexible members that are movably interconnected together, wherein the apertures change size or cross-sectional area as they are moved to change the shape of the flexible nozzle body.

In some embodiments, the nozzle includes at least one means for changing the shape of the flexible nozzle body that includes at least one circumferential assembly that has at least one articulatable member that defines an aperture having an aperture plane with a variable area when articulated. In some aspects, the circumferential assembly includes an iris assembly having a driving plate with a plurality of blades rotatably mounted to a circumferentially rotating assembly. In some aspects, each blade is fixedly mounted to a gear member, and each gear member is rotatably mounted to a gear plate. In some aspects, the circumferential assembly includes at least one adjustable loop assembly having an elongate member formed into a loop with an adjustment mechanism. In some aspects, the loop of the elongate member defines the aperture having the aperture plane.

In some embodiments, the means for changing the shape of the flexible body includes a first actuator that actuates the circumferential assembly to change the variable area of the aperture plane. In some aspects, the means for changing the shape of the flexible body includes a first actuator that actuates the iris assembly to change the variable area of the aperture plane with the plurality of blades. In some aspects, the means for changing the shape of the flexible body includes a first actuator that actuates at least one adjustable loop assembly to change the variable area of the aperture plane by varying the size of the loop. In some aspects, the first actuator pulls and/or pushes the elongate member relative to the adjustment mechanism to make the change in the variable area of the aperture plane. In some aspects, the first actuator includes at least a first motor and a first articulating arm.

In some embodiments, the means for changing the shape of the flexible body includes a second actuator that actuates at least one circumferential assembly in a longitudinal direction of the flexible body. In some aspects, the means for changing the shape of the flexible body includes a second actuator that actuates the iris assembly in a longitudinal direction of the flexible body. In some aspects, the means for changing the shape of the flexible body includes a second actuator that actuates the at least one adjustable loop assembly in a longitudinal direction of the flexible body. The actuators can be mechanical or hydraulic or other as known in the art.

In some embodiments, the CD nozzle includes a fluid-tight housing having an internal chamber that contains the flexible nozzle body. The CD nozzle can include at least one gas inlet valve in the housing to provide pressurized barrier gas to the internal chamber. The CD nozzle can include least one pump operably coupled to the at least one gas inlet valve to provide a barrier gas supply as the pressurized barrier gas to the internal chamber.

In some embodiments, the CD nozzle includes a controller operably coupled with the means for changing the shape of the flexible nozzle body. The controller can be coupled with any mechanical system to change the shape of the body of the CD nozzle. The controller can also be coupled to sensors that provide operational data to the controller, and in response the controller controls the operation of the CD nozzle. The controller can change the shape of the CD nozzle during operation or testing. The controller can receive regarding nozzle operation and nozzle output gas characteristics, then determine a modulation to the nozzle shape to modify the nozzle operation and nozzle output gas characteristics. This allows tailoring of the shape of the nozzle to obtain desired nozzle operation and nozzle output gas characteristics. For example, the operation of the wind tunnel can include changing the mass flow of the test gas through the nozzle over a period of time to simulate air in different regions or changing altitudes, or different modulations. The operation of the nozzle can cause the controller to actuate one or more of the actuators that control the means for changing the corresponding area of the nozzle flow path (e.g., cross-sectional area of plane) and/or changing position of one or more of the actuators relative to the inlet and outlet of the nozzle body. This dynamically changes the area of the regions controlled by the circumferential assemblies under control to simulate different operational conditions.

In some embodiments, a wind tunnel can include the CD nozzle of one of the embodiments. The wind tunnel can also include a test gas supply fluidly coupled with the inlet opening of the nozzle. A test cell/chamber can be provided that has at least a portion of the nozzle therein. An exhaust outlet is fluidly coupled with the outlet opening of the nozzle with a test region within the test cell between the outlet opening and exhaust diffuser. In some aspects, the gas supply includes a gas generation system. In some aspects, the gas generation system is configured for decomposing nitrous oxide to generate heat and obtain a Mach number of gas flow in the nozzle.

In some embodiments, a method of changing airflow can be performed with a variable CD nozzle as described herein. The method can be performed by operating the airflow in the CD nozzle, and operating the at least one means for changing the shape of the flexible body to change the dimension or the location of the throat plane relative to at least one of the inlet plane or outlet plane.

In some embodiments, a method of testing an object can use a wind tunnel with a variable CD nozzle in accordance with an embodiment provided herein. The method can include placing a test object in the test region of the test cell. Then, the CD nozzle can pass a test gas from the outlet opening of the nozzle onto the test object. The method can also include operating the at least one means for changing the shape of the flexible body to change the dimension or the location of the throat plane relative to at least one of the inlet plane or outlet plane to change at least one property of the test gas at the test object. In some aspects, the flexible body includes apertures between the plurality of flexible members that are movably interconnected together, and the method can include injecting a barrier gas through the apertures into the flow path so as to form a barrier gas layer between the test gas and the inner surface of the flexible nozzle body.

In some embodiments, the means for changing the shape of the flexible body includes at least one circumferential assembly that has at least one articulatable member that defines an aperture having an aperture plane with a variable area when articulated. Accordingly, the method can include: passing the test gas from the outlet opening to have a first parameter profile; articulating the at least one articulatable member to change the variable area of the aperture plane of the flexible nozzle body; and passing the test gas from the outlet opening to have a second parameter profile that is different from the first parameter profile in at least one parameter. In some embodiments, the method can include moving the throat plane of the flexible nozzle body relative to the inlet opening and outlet opening. As such, the shape can be changed by changing the area of the nozzle throat or changing the location of the nozzle throat.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 2A illustrates an embodiment of a wind tunnel comprising a variable dimension three-dimensional (3D) throat in a variable CD nozzle.

FIG. 2C provides a schematic representation of the articulatable member that can be for adjustable members at the inlet and outlet.

FIG. 2D provides a schematic representation of the articulatable member that can be for adjustable members at the throat.

Figure 1:
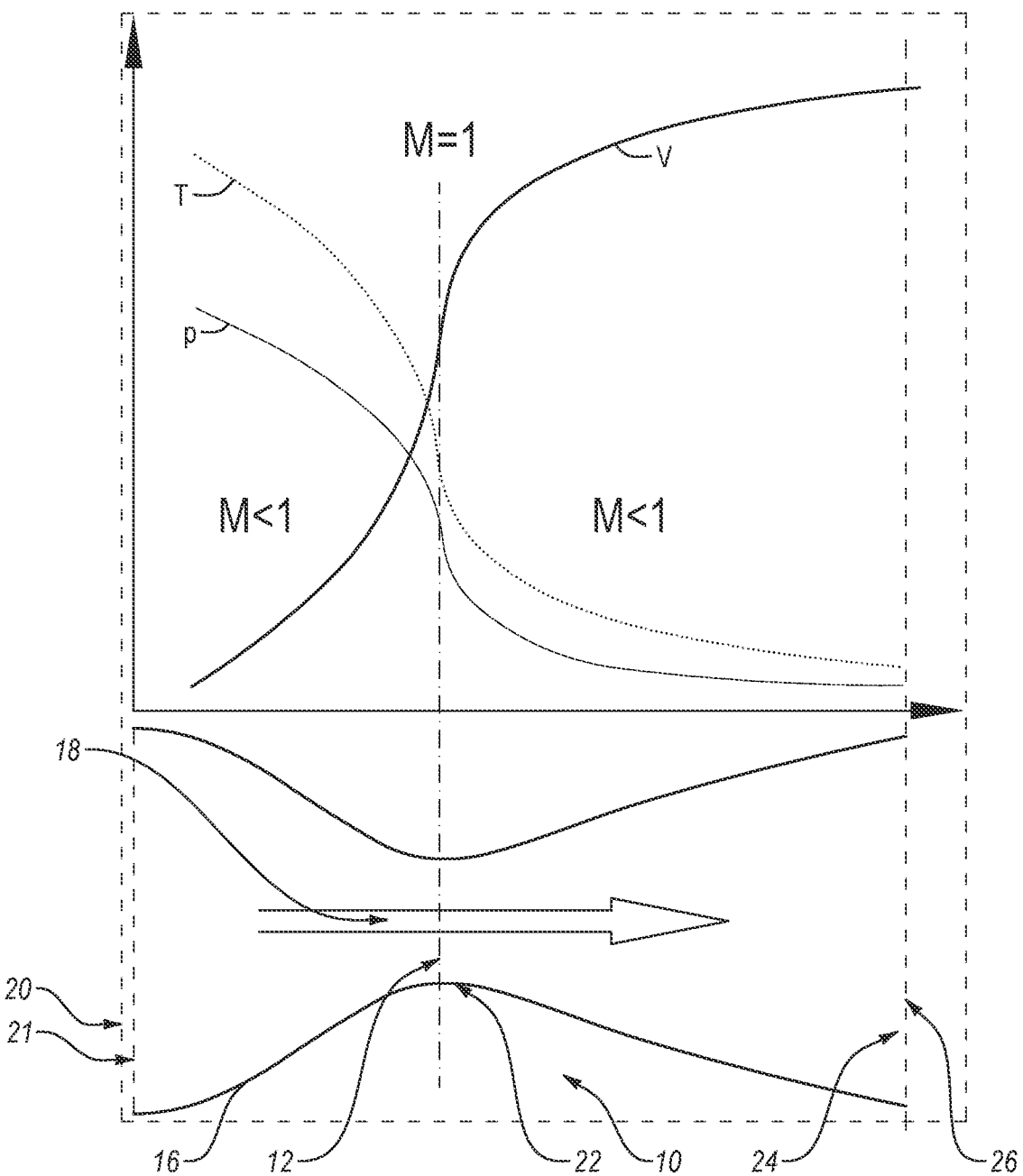
FIG. 1 illustrates an embodiment of a variable three dimensional (3D) convergent-divergent (CD) nozzle and the corresponding temperature, pressure and velocity of the test gas therein.

The elements and components in the figures can be arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present technology relates to a variable (e.g., adjustable on the fly) converging-diverging (CD) nozzle that can have the nozzle throat plane varied in area or location under mechanical control. The result is a variable, three dimensional (3D) CD nozzle that can have a variable mass flow and a Mach number that is capable of being varied during operation. That is, the nozzle throat plane can be varied by automated mechanisms that change the area of the throat plane and/or location of the throat plane relative to an inlet and/or outlet opening of the CD nozzle. The changes can be axisymmetric for the nozzle central axis. The CD nozzle is outfitted with a mechanical system that is configured to manipulate the flexible body of the nozzle in order to manipulate the shape of the flow path in the nozzle in an axisymmetric manner.

The present technology provides the ability to change the dimensions of the nozzle, which can be changed with a correlating time constant proportional to the rate of change of the areas of the nozzle. This change is shape of the nozzle can provide a variable geometry Mach nozzle that can be tuned during operation or changed on the fly. The variable CD nozzle allows a user to change the throat diameter/area, the exit diameter/area and the inlet diameter/area as desired or needed to obtain desired operational parameters of airflow. The variable CD nozzle can be mechanically actuated in real time, with lengthening of the nozzle body (e.g., converging-diverging tube) and/or twisting of the nozzle body to affect the change. Also, the mechanical actuators can apply radial forces with circumferential members to narrow and widen the nozzle throat area, as well as the inlet area and outlet area. While positive pressure inside of the flow path of the variable CD nozzle can inflate the shape, the system can use a counter external pressure to hold the flexible nozzle body in a desired shape. The mechanical system can also hold the flexible nozzle body in the desired shape with assistance from the external pressure of the barrier gas.

The present variable CD nozzle can be used with a wind tunnel. The configuration of the variable CD nozzle allows for the mechanical system to automatically change the nozzle so that the Mach number in a wind tunnel is adjustable on the fly, such as during a test with a test object (e.g., missile, plane, etc.). The variable CD nozzle includes a body with a three dimensional (3D) variable geometry capability so that the shape of the body in an axisymmetric manner that can be adjusted in order to vary the nozzle properties. The flexible nozzle body can be formed from a plurality of flexible members that are combined to form the shape of the nozzle. The mechanical system can be operated so that the shape of the nozzle is adjusted to adjust the properties of the test environment in the wind tunnel. For example, the nozzle can be implemented in a wind tunnel to test an aircraft design for aerodynamics, such as where hot gas (e.g., air-like gas) is being used to simulate different conditions and airspeeds the aircraft design is likely to encounter. The capability of simulating different conditions, such as different airspeed (e.g., Mach number), results from the movement of the flexible nozzle body of the CD nozzle, which is from movement of the flexible members that form the flexible nozzle body.

In some embodiments, the flexible body of the variable CD nozzle can be prepared with differently oriented (e.g., axial and radial) interlocking materials that are capable of withstanding the high temperature gases that have Mach numbers, where the interlocking materials make up the nozzle contour and shape. Manipulating the interlocking materials can change the nature of the interlock such that shape of the CD nozzle is manipulated. The mechanical system can impart forces to provide torque and axial applications of force or torque vectors from radial opening and closing to change a circumferential dimension of at least one location of the CD nozzle (e.g., at the nozzle throat), which causes movement of the position and/or area of the nozzle throat and changes the area ratio of the nozzle from the nozzle throat area with the outlet area. This approach allows real time adjustment of the downstream mass flow and/or Mach number in a wind tunnel.

In some embodiments, the CD nozzle can be adjusted during operation in order to vary Mach numbers in a wind tunnels. Typically, Mach numbers are set and are defined by the shape and sizing of the features of the CD nozzle, such as by the central axisymmetric converging and diverging nozzle. That is the 3D volume around the central axis of the CD nozzle is substantially the same and at each point along the longitudinal length of the central axis on the circumferential perimeter. Adjustment of the area or location of the nozzle throat can be performed by an automated controller causing operation of the mechanical system that is operably coupled with the body of the variable CD nozzle. The use of the controller provides the ability to quickly change the Mach number in a wind tunnel application, which can be done automatically to change the Mach number to a predetermined value or an adjusted value or tuned value. The Mach number can be adjusted by adjusting the 3D shape of the nozzle under controller control, or under control of a user operating the controller.

In some embodiments, the variable CD nozzle has an adjustable geometry formed of flexible members prepared of a material that is capable of withstanding the thermal loads found in CD nozzles operating in wind tunnel environments. The flexible members that can be moved and adjusted provide for a variable CD nozzle that allows for the ability to adjust mass flow and set mass flow in a wind tunnel via an adjustable throat area (e.g., adjustable diameter at nozzle throat plane). Also, the flexible members that can be moved and adjusted allow for the ability to set the expansion area downstream from the nozzle throat plane via the independent adjustments of the nozzle dimensions (and area) of at least the nozzle throat plane and nozzle outlet plane, and optionally the nozzle inlet plane, as well as any number of locations therebetween. Adjustment of the relative position and/or orientation of the flexible members allows for tailoring the Mach number during operation and then setting the Mach number for extended tests.

In some embodiments, the body of the variable CD nozzle includes the plurality of flexible members that are interlocked together, such as in a braid or weave, or the like. The flexible members can be in various forms, such as those described herein, which can include elongate bodies of temperature resistant materials that are associated together. The body can include some flexible members in a clock wise rotation from inlet to outlet interlocked with some flexible members in a counter-clock rotation. The differently oriented flexible members can also be axial members and radial members that are interconnected together.

Figure 1A:
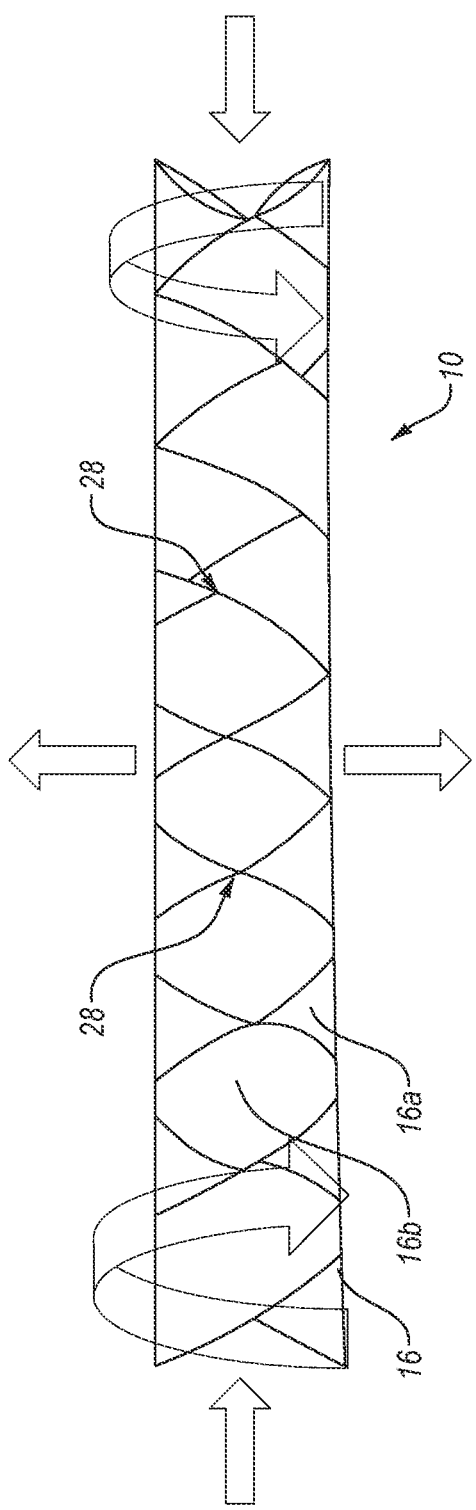
FIG. 1A shows a radial pulling force and/or longitudinal pushing force that opens or widens the throat of a variable CD nozzle.
Figure 1B:
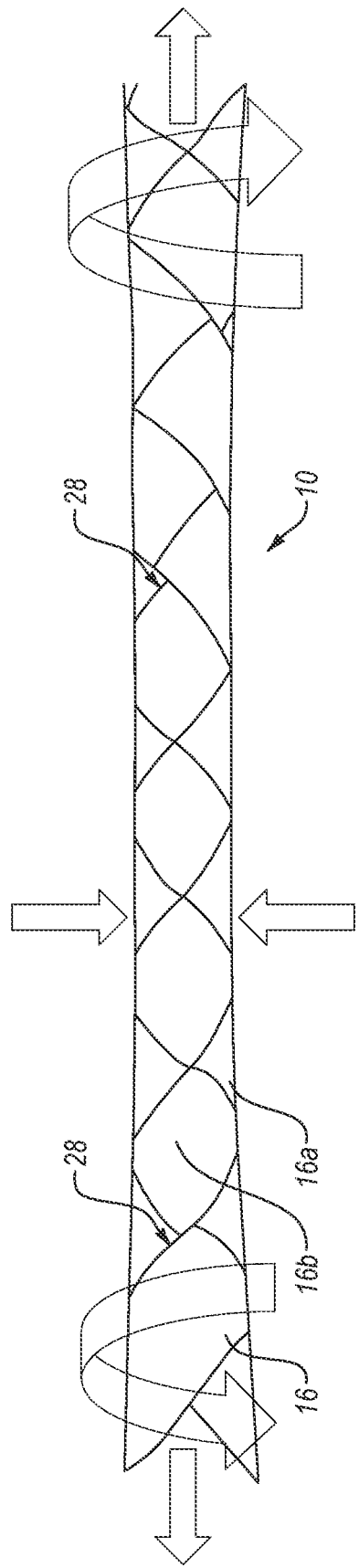
FIG. 1B shows a radial pushing force and/or longitudinal pulling force that closes or narrows the throat of a variable CD nozzle.

FIG. 1 illustrates an embodiment of a variable three dimensional (3D) convergent-divergent (CD) nozzle 10 and the corresponding temperature, pressure and velocity of the test gas therein. The "M" designates the relative values of the Mach number before the nozzle throat plane 12 (M<1), at the nozzle throat plane 12 (M=1) and after the nozzle throat plane 12 (M>1) such as the outlet 24. The CD nozzle can include a flexible body 16 defining a flow path 18 having an inlet opening 20 with an inlet plane 21 extending through a narrowed throat 22 with a throat plane 12 to an expanded outlet opening 24 with an outlet plane 26. The flexible body 16 comprises a plurality of flexible members 16a, 16b movably interconnected together (see FIGS. 1A-1D). The CD nozzle includes at least one means (202) for changing a shape of the flexible body 16 to change a dimension or location of the throat plane 12 relative to at least one of the inlet plane 21 or outlet plain 26 (FIG. 2B).

The inlet test gas has an initial gas pressure $p_o$, initial gas density $\rho_o$, and initial temperature $T_o$ with a velocity of V, with the cross-section are being $S_x$ (as a function of distance from the inlet to the position x), which are then used to determine the outlet pressure p, density $\rho$, and temperature T.

In some embodiments, the CD nozzle 10 is configured as a variable dimensional venturi for varying and setting Mach numbers in a wind tunnel. The body 12 of the CD nozzle 10 can be formed from the plurality of interconnected elongate members (16a, 16b) of a ceramic and/or composite and/or metallic material that can withstand high temperatures of Mach wind tunnels. The body 16 can resemble a "cloth" configured with interconnected members (e.g., strands, ribbons, etc.). The body 16 can be configured similar to a finger trap, and can be manipulated similarly. The finger trap shape is shown to illustrate the operation of the CD nozzle 10 in FIGS. 1A-1B. As shown, the nozzle 10 can include a plurality of flexible members 16a, 16b interconnected together. The flexible members 16a, 16b can be clockwise members 16a (axial) and counterclockwise members 15b (radial) that are interlocked together so that there are apertures 28 therebetween (e.g., at junction of the clockwise members 16a and counterclockwise members 16b), such as slit apertures between adjacent surfaces. The members 16a, 16b can be configured as sliding ribbons or cords, wherein the dimensions of the nozzle 10 change depending on the forces applied thereto or to the body overall. In some aspects, the dimensions of the nozzle 10 can change by pushing on the ends so that the ends become closer together so that the nozzle throat widens, such as shown in FIG. 1A, where the arrows show the displacement of the nozzle 10. FIG. 1B shows the displacement of the nozzle 10 when the ends are pulled apart so that the nozzle throat narrows as shown by the arrows. Accordingly, axial displacement of the ends of the nozzle 10, such as by longitudinal forces or torque applied to the ends, can be used for varying the converging/diverging shape of the nozzle 10. The nozzle 10 is an example of an axisymmetric design, where the 3D volume around the central axis is uniform or symmetrical. The arced arrows at the ends of the nozzle 10 show the direction of rotation or torque to shorten the nozzle 10 and widen the nozzle throat (FIG. 1A) or to lengthen the nozzle 10 and narrow the nozzle throat (FIG. 1B).

Also, when the central arrows represent applied radial forces, the nozzle 10 can change the area of the throat, which may also change the relative position of the inlet and outlet. FIG. 1A shows a throat pulling force (e.g., radial) that opens or widens the throat. FIG. 1B shows a throat pushing force (e.g., radial) that closes or narrows the throat.

Figure 1C:
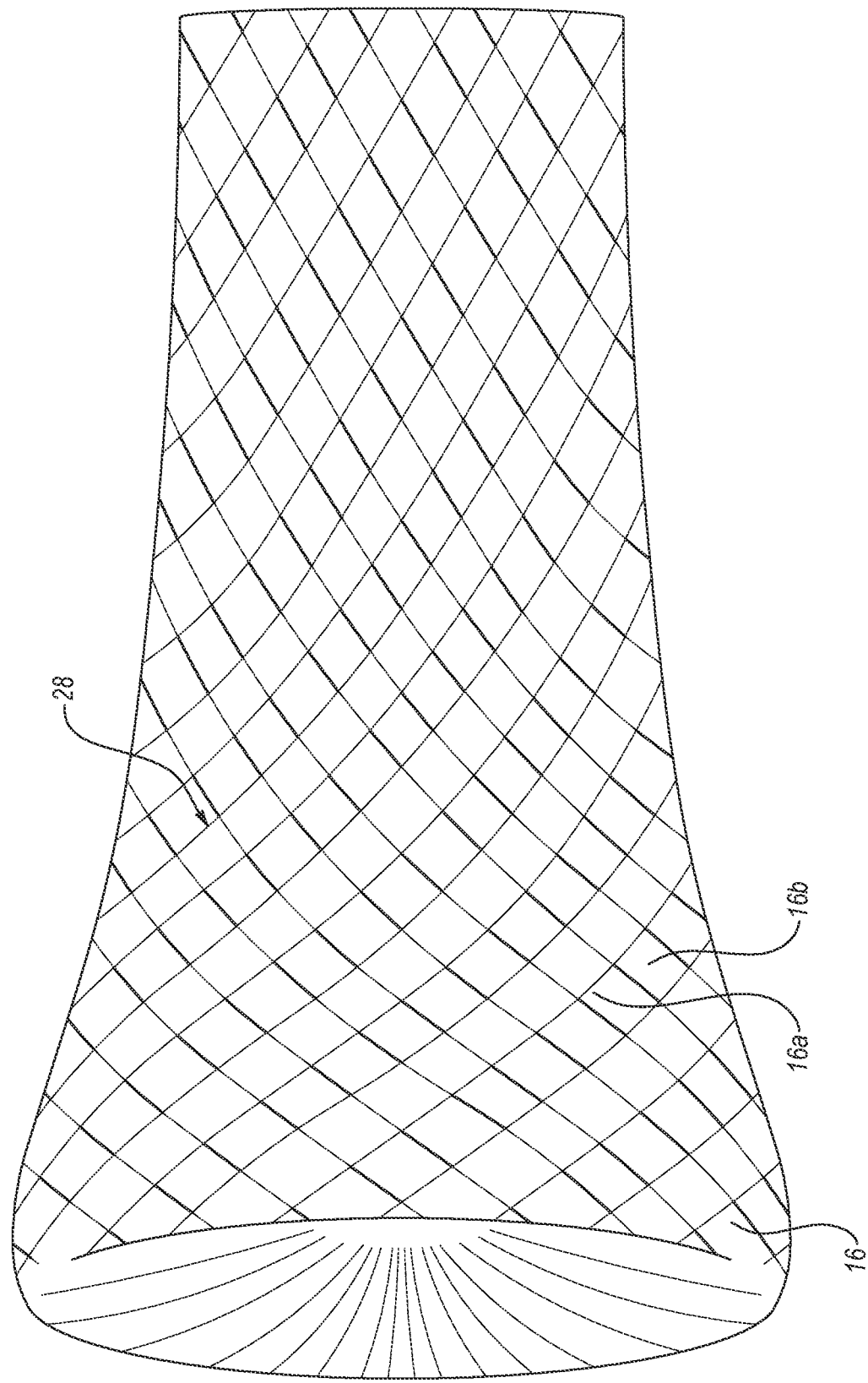
FIG. 1C shows an example of a portion of the variable CD nozzle body formed from the plurality of flexible nozzle body members.
Figure 1D:
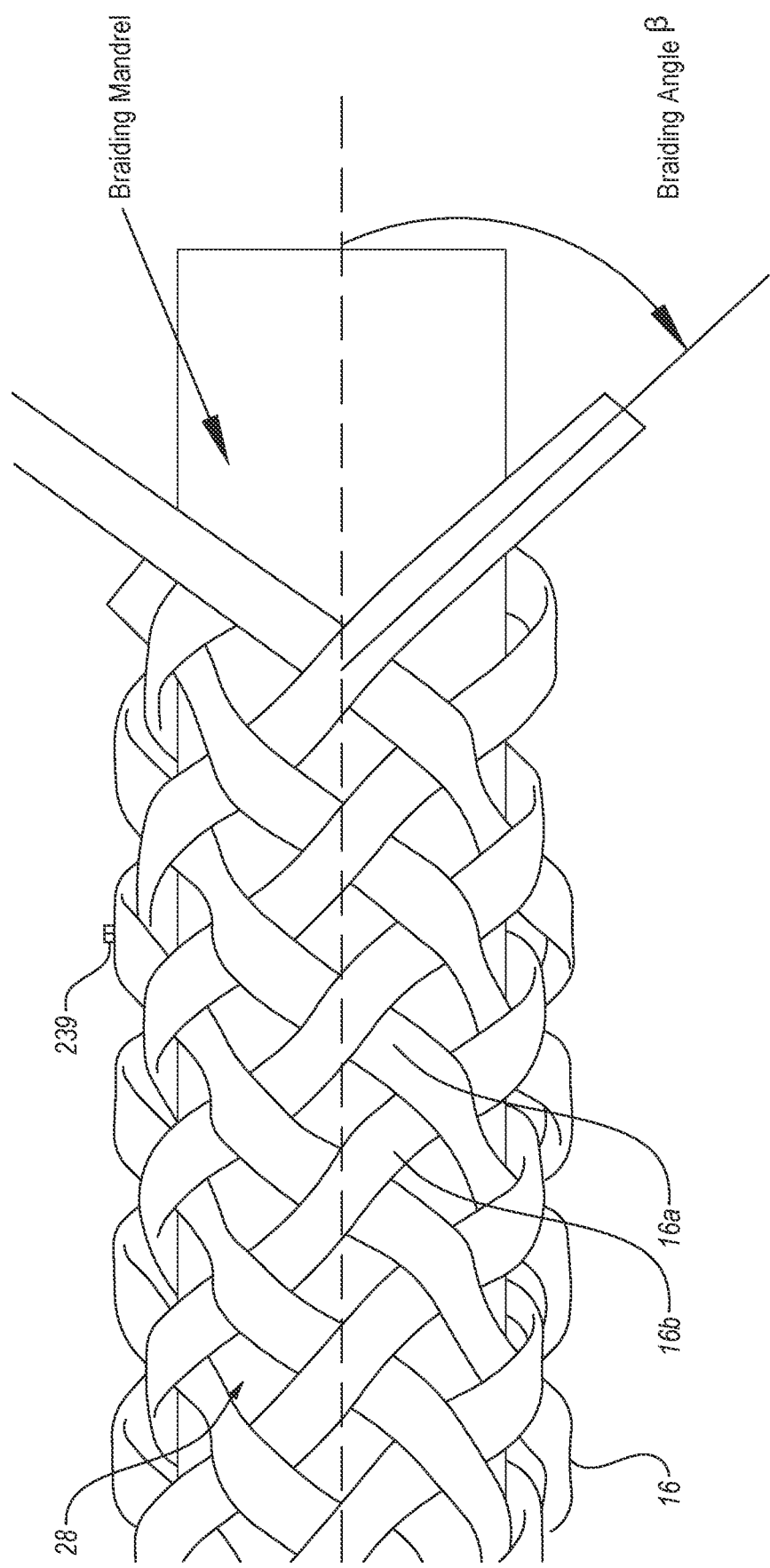
FIG. 1D shows an example of portion of the variable CD nozzle body formed from the plurality of flexible nozzle body members, and the braiding thereof.
Figure 2B:
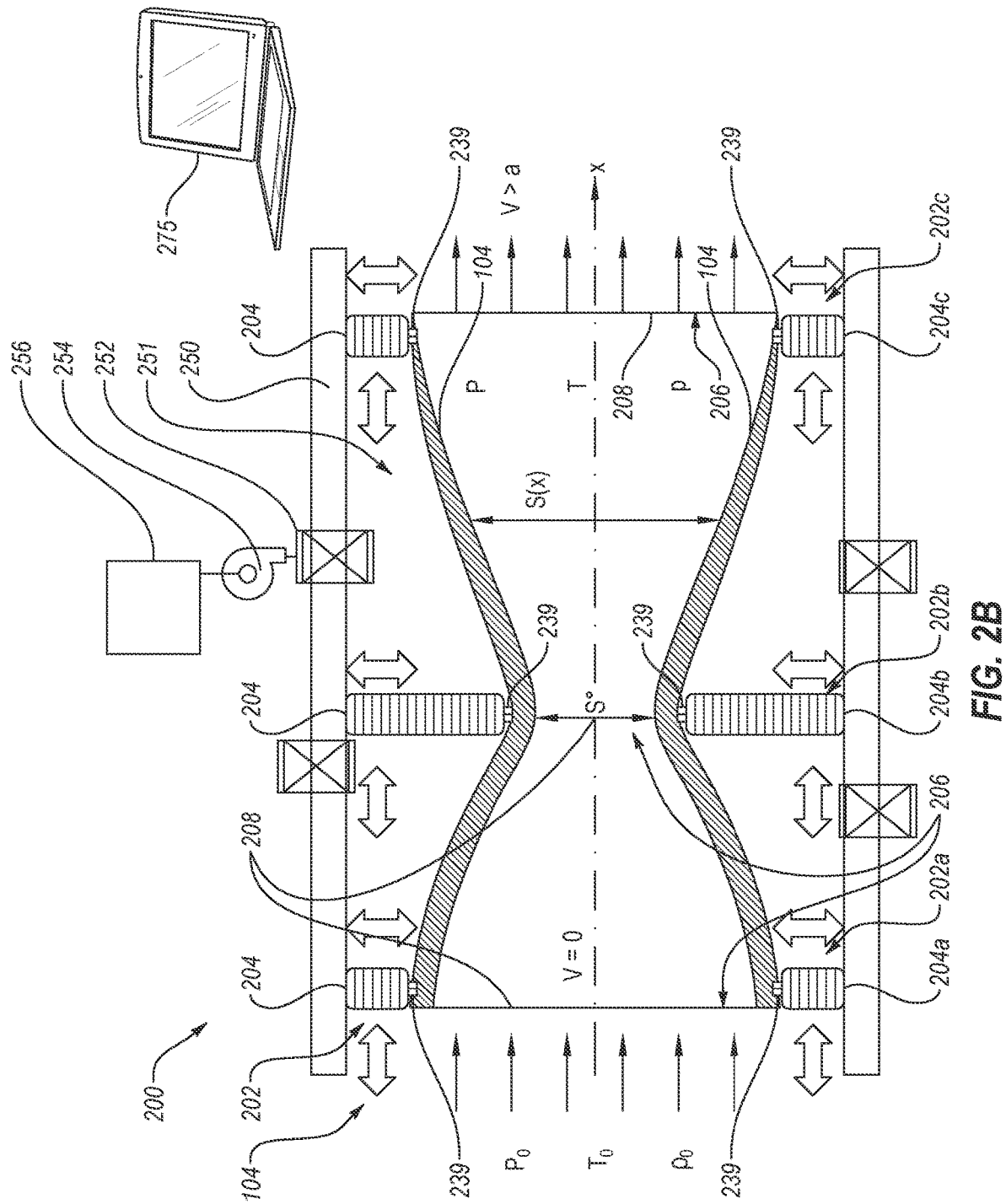
FIG. 2B shows an embodiment of the nozzle system that has the variable CD nozzle.

FIGS. 1C-1D show examples of the body 16 formed from the plurality of flexible members 16a, 16b. As shown, the plurality of flexible members 16a, 16b are movably interconnected together by a movable interlace, interweave, intertwine, plait, entwine, cross-cross, weave, knit, lace twist, wind or other association thereof to form the flexible body. The individual flexible members 16a, 16b can include cord, thread, string, strap, tape, line, rope, cable, wire, ligature, twine, yarn, ribbon, strip, fiber, filament, petal, sheet, or combinations thereof or interlace, interweave, intertwine, plait, entwine, cross-cross, weave, knit, lace twist, wind, needlefelt, woven fabric, wet-laid nonwoven, dry laid nonwoven, and spunlace nonwoven, thereof for each flexible member. As such, each member 16a, 16b can be a monofilament or a multifilament configuration. The flexible body 16 includes apertures 28 (e.g., slit apertures) between the plurality of flexible members 16a that are movably interconnected together.

In some embodiments, the flexible members 16a, 16b can be prepared from temperature resistant materials, such as aramid fibers or fabrics, para-aramid fibers (Kevlar, Twaron, Technora, meta-aramid fibers (Nomex, TeijinConex), polytetrafluoroethylene fibers (e.g., Teflon, Toyoflon), polyphenylene sulfide fibers (Ryton, Procon, TorayPPS), melamine fibers (Basofil), poly-phenylene-benzobisoxazole (Zylon), polybenzimidazole (PBI), polyimide (P-84), pyrolytic carbonization of modified acrylic fiber (Lastan), carbon fibers (polyacrylonitrile, pitch), high density polyethylene (HDPE; Spectra, Dyneema), steel, stainless steel, titanium, tungsten, molybdenum, nickel, tantalum iron, metal alloys thereof, and combinations thereof. Some examples of high temperature cloths that can be included as the temperature resistant flexible members can include cloths such as fiberglass (Tetraglas®), silica (Tetraglas 3000®), ceramic, fireblanket (Silco Shield®), tacky cloth (Tetraglas-T®), and others.

FIG. 1D shows the clockwise members 16a and the counterclockwise members 16b braided on a braiding mandrel 40, and having a braiding angle β. The braiding mandrel 40 can have the converging-diverging shape of the Laval-type nozzle to form the CD shape of the nozzle body. However, this is only an example of braided body 16, where other associations of may be used as described herein or generally known to prepare a flexible body CD nozzle with a plurality of flexible members.

FIG. 2A illustrates one embodiment of a wind tunnel 100 comprising a variable dimension three-dimensional (3D) throat 102. As shown, the wind tunnel 100 includes a variable three-dimensional throat 102, an entry section 132 coupled to a first side of the three-dimensional throat 102, and an exit section 134 coupled to a second side of the variable three-dimensional throat 102. The entry section 132, the three-dimensional throat 102, and the exit section 134 define a flow path. The three-dimensional throat 102 comprises the body 104 formed of the interconnected plurality of elongate members. The body 104 comprises a form that is flexible so that the dimensions can be adjusted. An air source 136 is configured to provide air flow from the entry section 132 to the exit section 134. The three-dimensional throat 102 provides a variable cross-section 106 that can have the area thereof expanded or contracted, in symmetrical 3D shape around the center axis (axisymmetric). The three-dimensional throat 102 maintains a well-conditioned air flow while varying the flight Mach number within the wind tunnel 100 continuously within a predetermined range, such as, for example, Mach 2-8. The operational Mach range of the wind tunnel 100 is related to the area ratio change of the three-dimensional throat 102. For example, in one embodiment, an area ratio change factor of 12 may allow continuous operation within a range of Mach 3-6. As another example, in one embodiment, an area ratio change factor of 50 enables continuous operation over a range of Mach 3-8. In some embodiments, the three-dimensional throat 102 comprises an asymmetric connection for direct-connect simulation of inlet conditions.

The three-dimensional throat 102 is variable in area to produce a variable cross-section 106 between the entry section 132 and exit section 134. The three-dimensional throat 102 provides a continuously changeable air speed within the predetermined range. For example, in one embodiment, a three-dimensional throat 102 provides a continuously variable air speed within the range of Mach 1, 2, or 3 to Mach 8 or even higher. In one embodiment, the three-dimensional throat 102 is coupled to one or more actuators configured to continuously vary or set the cross-section 106 of the three-dimensional throat 102 from a first cross-section to at least a second cross-section. The one or more actuators may comprise, for example, a linear actuator coupled to a circumferential member that can adjust the circumference thereof so as to change the circumference of the cross-section 106, and thereby the nozzle throat 102.

The gas temperature and pressure in the three-dimensional throat 102 increases with increasing Mach numbers. In some embodiments, the flexible body 104 is configured to allow uncooled operation of the wind tunnel 100 up to a predetermined Mach speed having a corresponding temperature. For example, in one embodiment, the body 104 comprises a ceramic fiber weave capable of continued operation at temperatures up to 2300° F., corresponding to Mach numbers up to about Mach 8. For higher Mach numbers, and corresponding higher temperatures, an active cooling system is coupled to the three-dimensional throat 102, such as by cooling with a barrier gas passed through the apertures between the members that form the flexible body 104 (e.g., 16a, 16b for 16). For example, in one embodiment, the body 104 includes one or more holes and/or apertures and/or ducts between the members for coupling to an active cooling system, such as cooling barrier gas. Active cooling systems may comprise, for example, back-face cooling utilizing a cavity filled with a flowing or static gas, a coolant fluid passed through one or more cooling channels attached to and/or formed in the body 104, and/or transpiration using holes and/or ducts (e.g., aperture 28) formed in the body 704. Cooling systems may be selected, for example, based on the heat flux that can be tolerated by the cooling system.

FIG. 2B shows an embodiment of the nozzle system 200 that has the variable CD nozzle 104. The CD nozzle 104 is shown to be within the fluid-tight housing 250 having an internal chamber 251 that contains the flexible body 16. The fluid-tight housing 250 includes at least one gas inlet valve 252 in the housing 250 to provide pressurized barrier gas to the internal chamber 251. Also, a pump 254 can be operably coupled to each gas inlet valve 252 to provide a barrier gas supply 256 as the pressurized barrier gas to the internal chamber 251. The adjustable CD nozzle 104 is shown to include at least one means 202 for changing a shape of the flexible body 16 to change a dimension or location of the throat plane 12 relative to at least one of the inlet plane 21 or outlet plain 26 (FIG. 2B). Also included is at least one articulatable member 204 that can articulate the body 16 to change the shape of the adjustable CD nozzle 104, such as described herein. FIG. 2B. also shows the anchors 239 that couple the articulatable member 204 with the body 16 or individual elongate nozzle body members 16a, 16b FIG. 2C provides a schematic representation of the articulatable member 204 that can be for adjustable members 204a,c as shown. The articulatable members 204a,c can have a wider aperture 206 as shown compared to the throat articulatable member 204b. The articulatable members can be in various configurations, such as the iris assembly and adjustable loop assembly as described herein. Also, the member can be a donut balloon that is selectively filled or partially filed to provide a desired aperture 206 area. The donut balloons can be at the inlet, throat, and outlet, and any number placed therebetween. The member can be an adjustable loop. Other members that can selectively change size are also contemplated. FIG. 2D provides a schematic representation of the articulatable member 204 that can be for adjustable members 204b at the throat as shown.

Figure 3A:
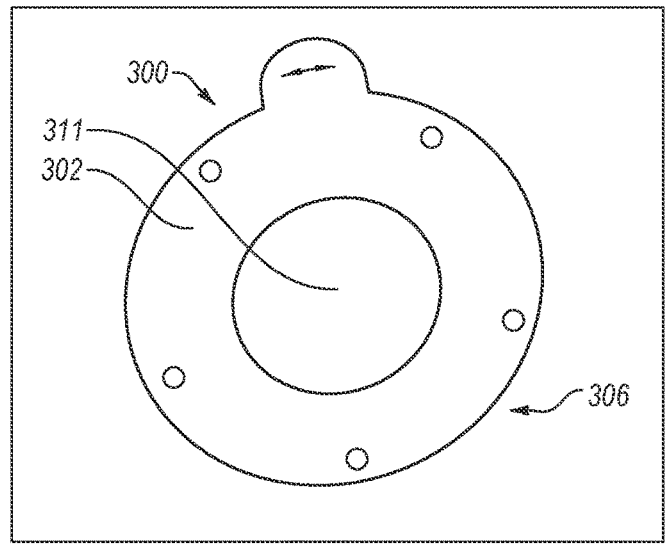
FIGS. 3A-3D illustrate an embodiment of an iris assembly, which can open and close in a radial manner.
Figure 3B:
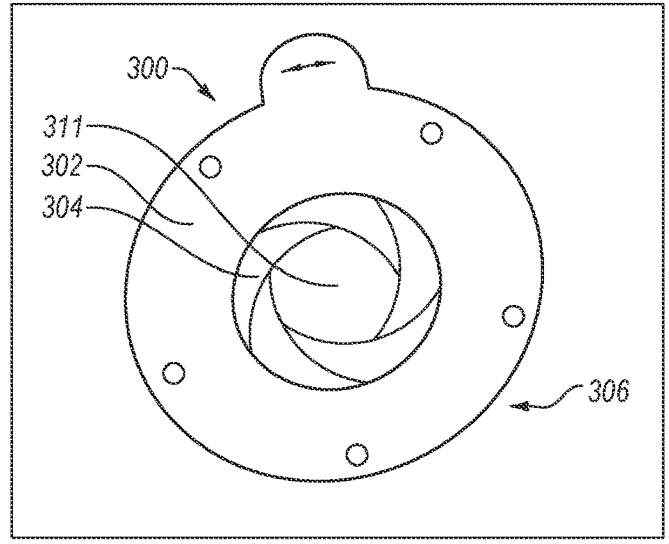
Figure 3C:
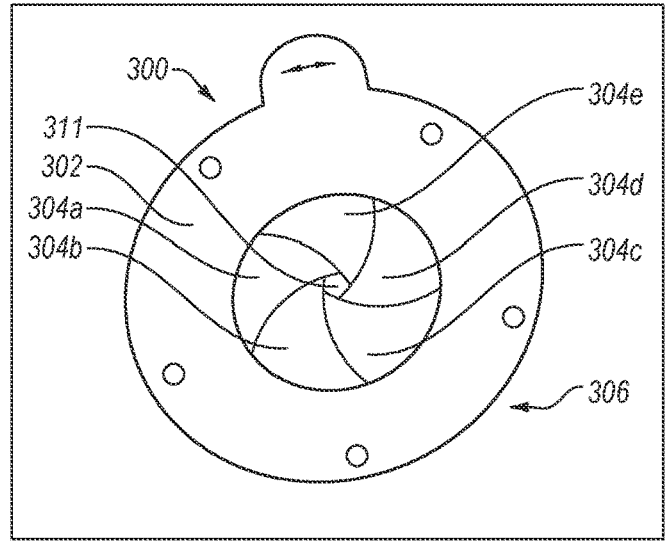
Figure 3D:
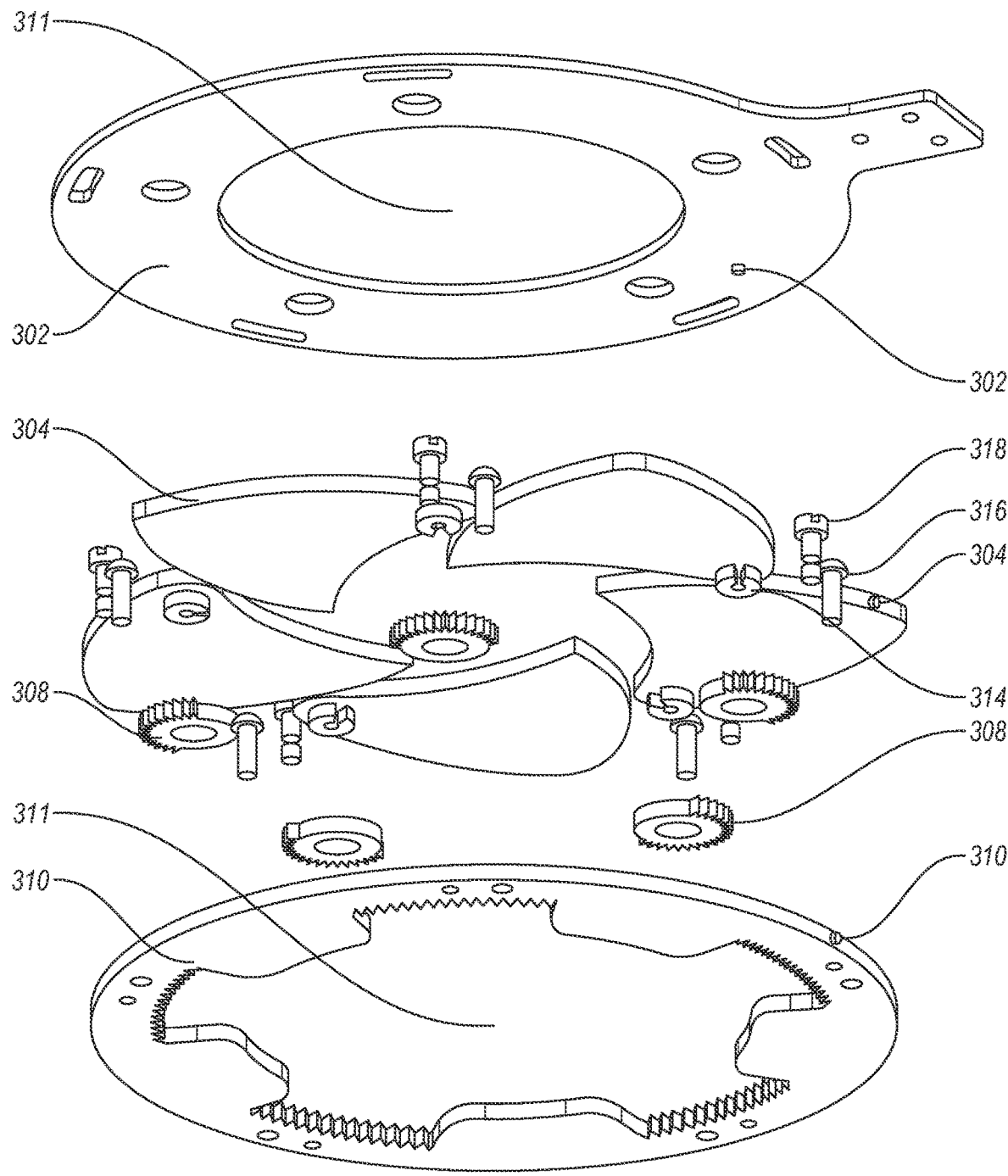

FIGS. 3A-3D illustrate an iris assembly 300, which can open and close in a radial manner. As shown, the iris assembly 300 includes: a fixed plate 310; gear sector 308; shaft 314; blade 304; bolts 316; shoulder bolts 318; and driving plate 302. The bolts 316 are used to assemble the fixed plate 310 onto other equipment, such as actuator or base or frame coupled thereto, or other support. There is internal gear structure on the fixed plate 310, which is designed for laser cutting or 3d printing. The gear sector 308 and blade 304 are connected by the shaft 314, which is coupled tightly. The shoulder bolt 318 is used to connect the driving plate 302 to the blades 304, which are coupled to the fixed plate 310. Rotation of the driving plate in one direction (e.g., clockwise), closes the aperture 311 between the blades 304. As the blades 304 rotate they close the aperture 311 from FIG. 3A to FIG. 3B showing a partially closed aperture 311 to FIG. 3C showing a mostly closed aperture 311. During use, the body 16 of the CD nozzle 10 is placed so that the nozzle throat 12 is within the aperture 311.

Accordingly, the CD nozzle can include at least one means (e.g., iris assembly 300) for changing the shape of the flexible nozzle body 16 that includes at least one circumferential assembly 202 (iris assembly 300) that has at least one articulatable member 204 (e.g., blade 304) that defines an aperture 206 (e.g., aperture 311) having an aperture plane 208 with a variable area when articulated. The at least one circumferential assembly 202 can include an iris assembly 300 having a driving plate 302 with a plurality of blades 304 rotatably mounted to a circumferentially rotating assembly 306. Each blade 304 is fixedly mounted to a gear member 308, and each gear member 308 is rotatably mounted to a gear plate 310. The gear members 308 can be rotated to rotate the blades 304 in unison to open or close the aperture 311.

Figure 4:
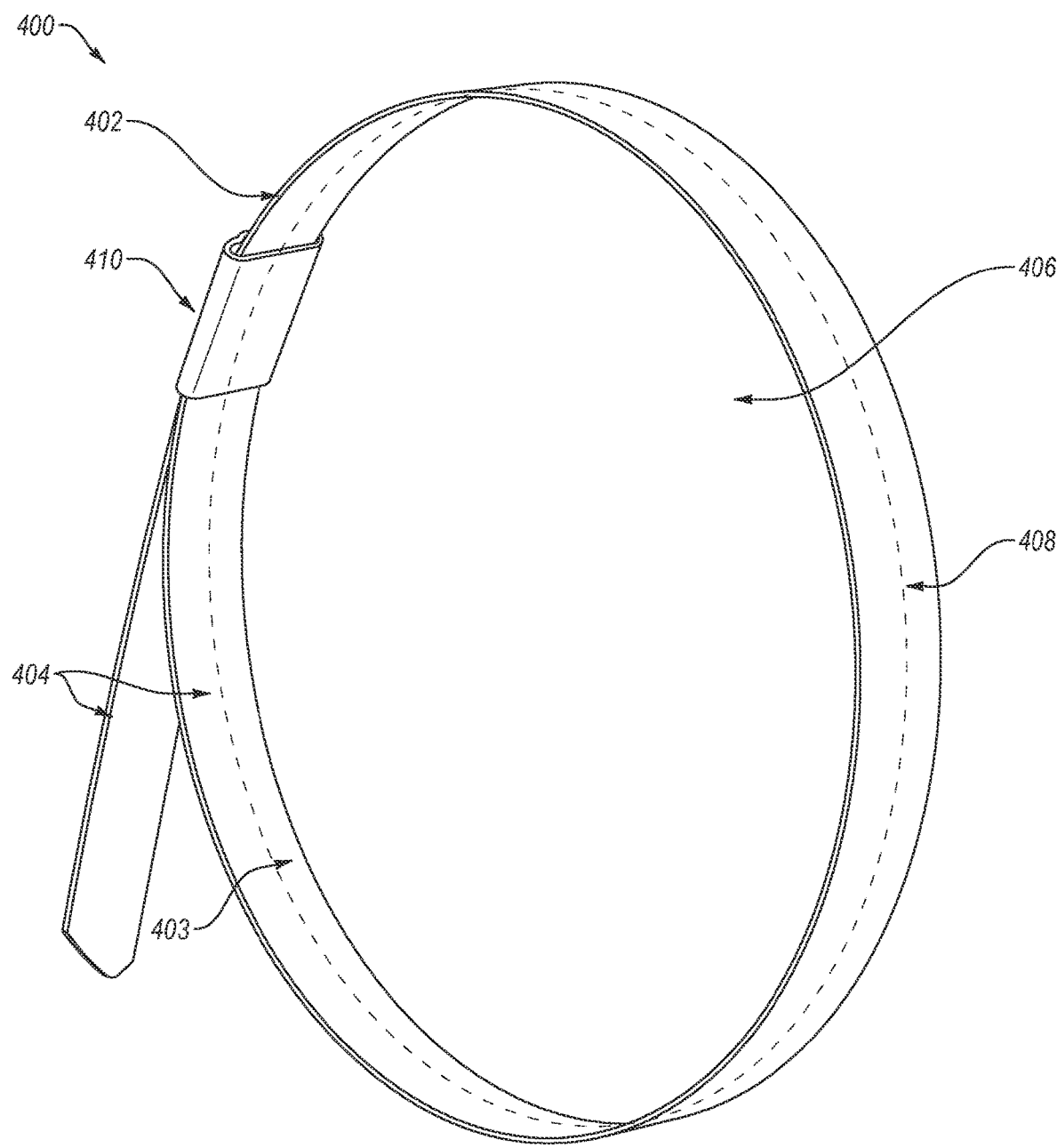
FIG. 4 shows an embodiment of a circumferential assembly that includes at least one adjustable loop assembly having an elongate member formed into a loop with an adjustment mechanism.

FIG. 4 shows another example of a circumferential assembly 402 includes at least one adjustable loop assembly 400 having an elongate member 404 formed into a loop 403 with an adjustment mechanism 410. As shown, the loop 403 of the elongate member 404 defines the aperture 406 having the aperture plane 408. The adjustable loop assembly 400 can be opened by pulling a free end of the elongate member 404 out from the adjustment mechanism 410, or closed by pushing the free end of the elongate member 404 into the adjustment mechanism 410. The free end of the elongate member 404 can be coupled to a mechanical system, such as an actuator.

Figure 5A:
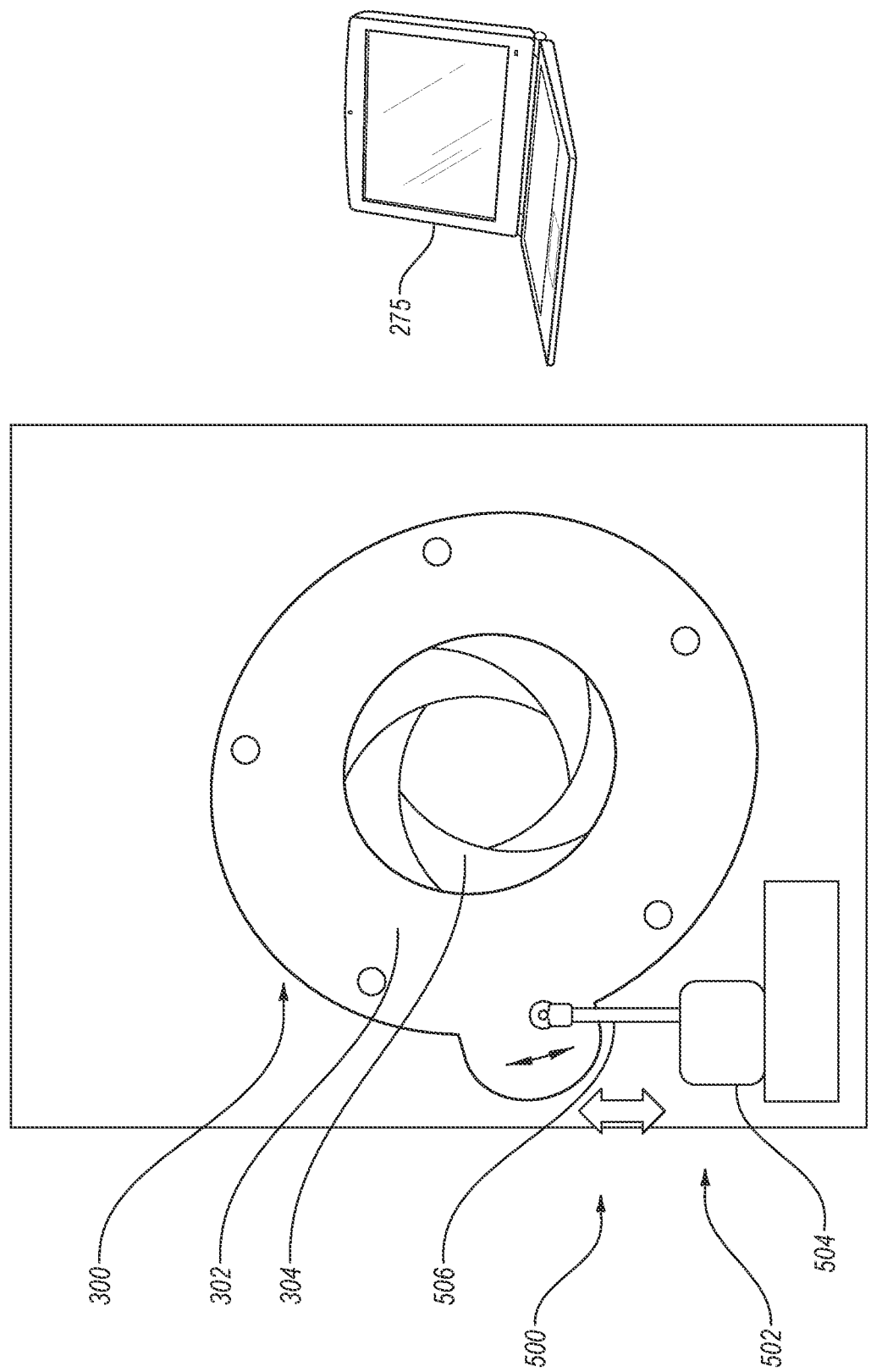
FIG. 5A shows an embodiment the iris assembly being coupled to an actuator assembly for radial actuation of the iris components (blades).

FIG. 5A shows the iris assembly 300 coupled to an actuator assembly 500. The actuator assembly 500 can be configured to operate as a means for changing the shape of the flexible nozzle body 16. The actuator assembly 500 can include a first actuator 502 that actuates at least one circumferential assembly 202 to change the variable area of the aperture plane 208 (see FIG. 2). In some aspects, the means for changing the shape of the flexible body 16 includes the first actuator 502 that actuates the iris assembly 300, such as by being connected to the driving plate 302, such as a tab of the driving plate 302 to change the variable area of the aperture plane with the plurality of blades 304.

Figure 5B:
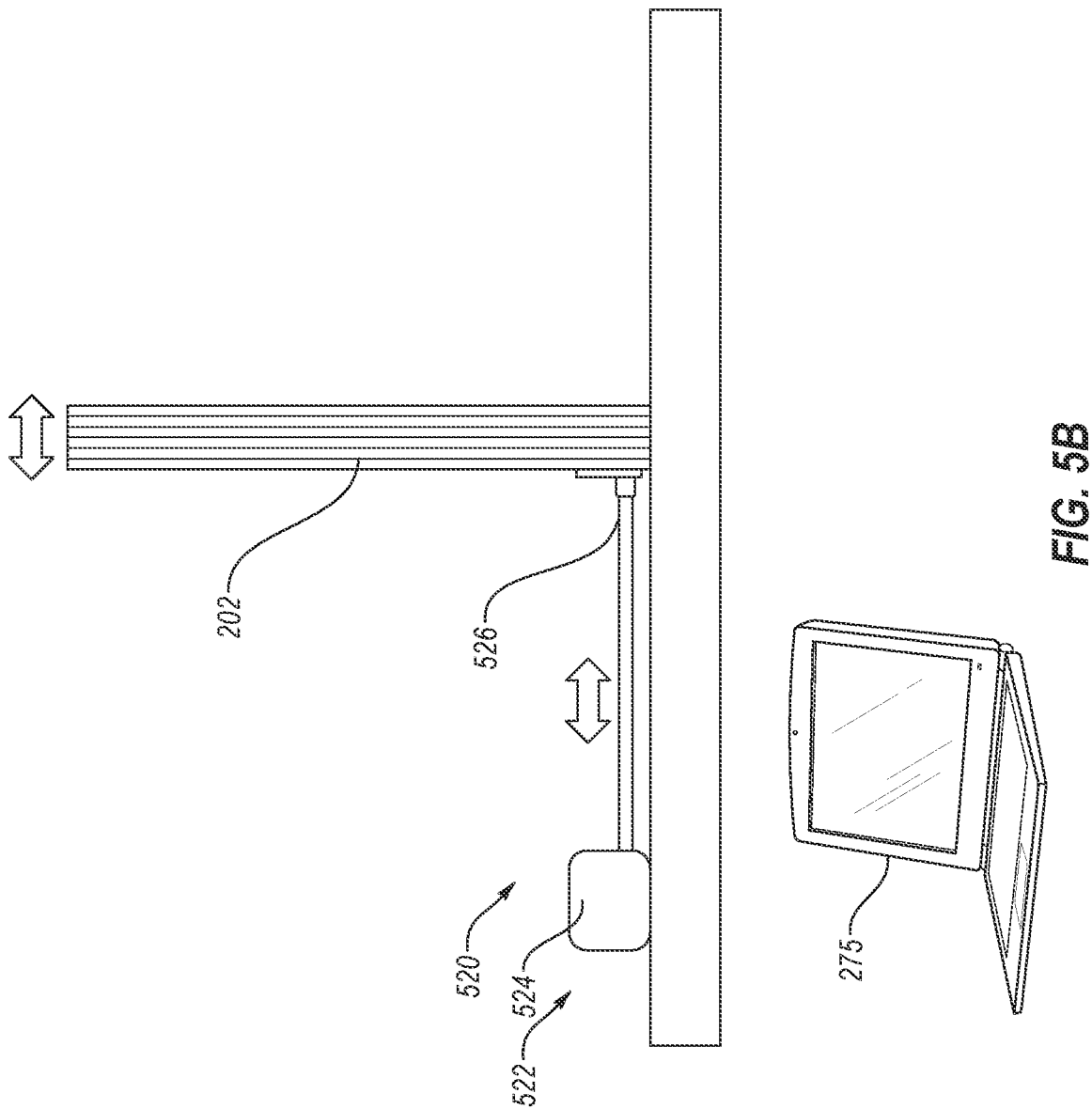
FIG. 5B shows an embodiment of the means for changing the shape of the flexible body that includes a longitudinal actuator that actuates the at least one circumferential assembly in a longitudinal direction of the flexible body.
Figure 5C:
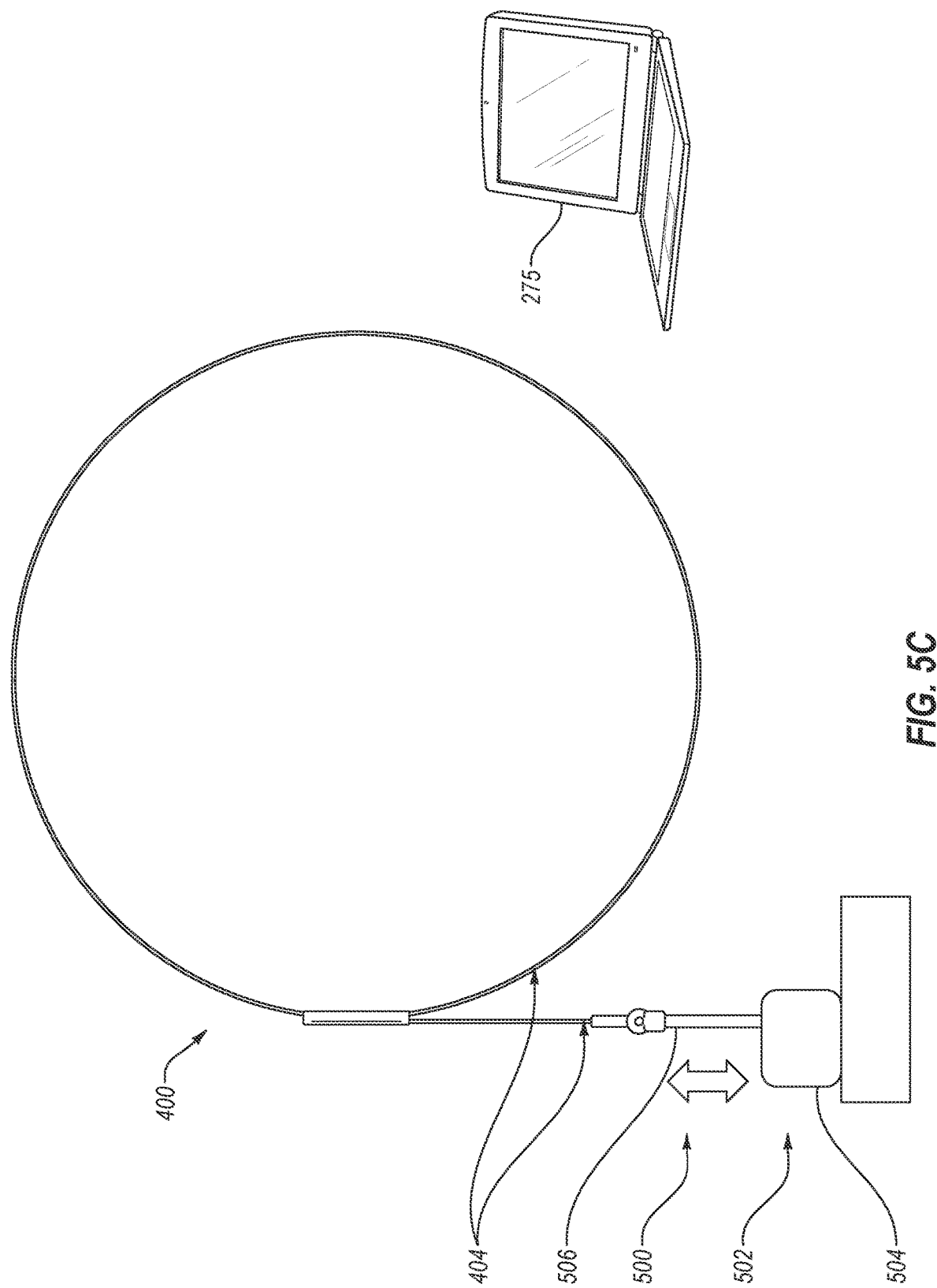
FIG. 5C shows an embodiment of a means for changing the shape of the flexible body that can include a first actuator that actuates the at least one adjustable loop assembly to change the variable area of the aperture plane by varying the size of the loop.

FIG. 5C shows a means for changing the shape of the flexible nozzle body 16 includes an actuator system 500 with a first actuator 502 that actuates the at least one adjustable loop assembly 400 to change the variable area of the aperture plane 408 by varying the size of the loop 403. The actuator 502 can open or close the loop assembly 400 around the flexible body 16. Any number of flexible loops can be operably coupled with a corresponding number of first actuator 502, at any positions through the body 16. As shown, the first actuator 502 pulls and/or pushes the free end of the elongate member 404 relative to the adjustment mechanism 410 to make the change in the variable area of the aperture plane 408.

As shown in FIGS. 5A and 5C, the first actuator 502 includes at least a first motor 504 and a first articulating arm 506. The first motor 504 moves the articulating arm 506, which in turn actuates the means for changing the shape of the flexible body.

As shown in FIG. 5B, the means for changing the shape of the flexible body includes a second actuator 522 that actuates the at least one circumferential assembly 202 in a longitudinal direction of the flexible nozzle body 16. The means for changing the shape of the flexible body 16 includes a second actuator 522 that actuates the iris assembly 300 in a longitudinal direction of the flexible nozzle body 16. Alternatively, the means for changing the shape of the flexible nozzle body includes a second actuator 522 that actuates the at least one adjustable loop assembly 400 in a longitudinal direction of the flexible nozzle body 16. Any number of means can be included along the length of the nozzle body to longitudinally change the longitudinal location of the circumferential assemblies 202. The general circumferential assembly 202 can represent the iris assembly 300 or the adjustable loop assembly 400.

Figure 6:
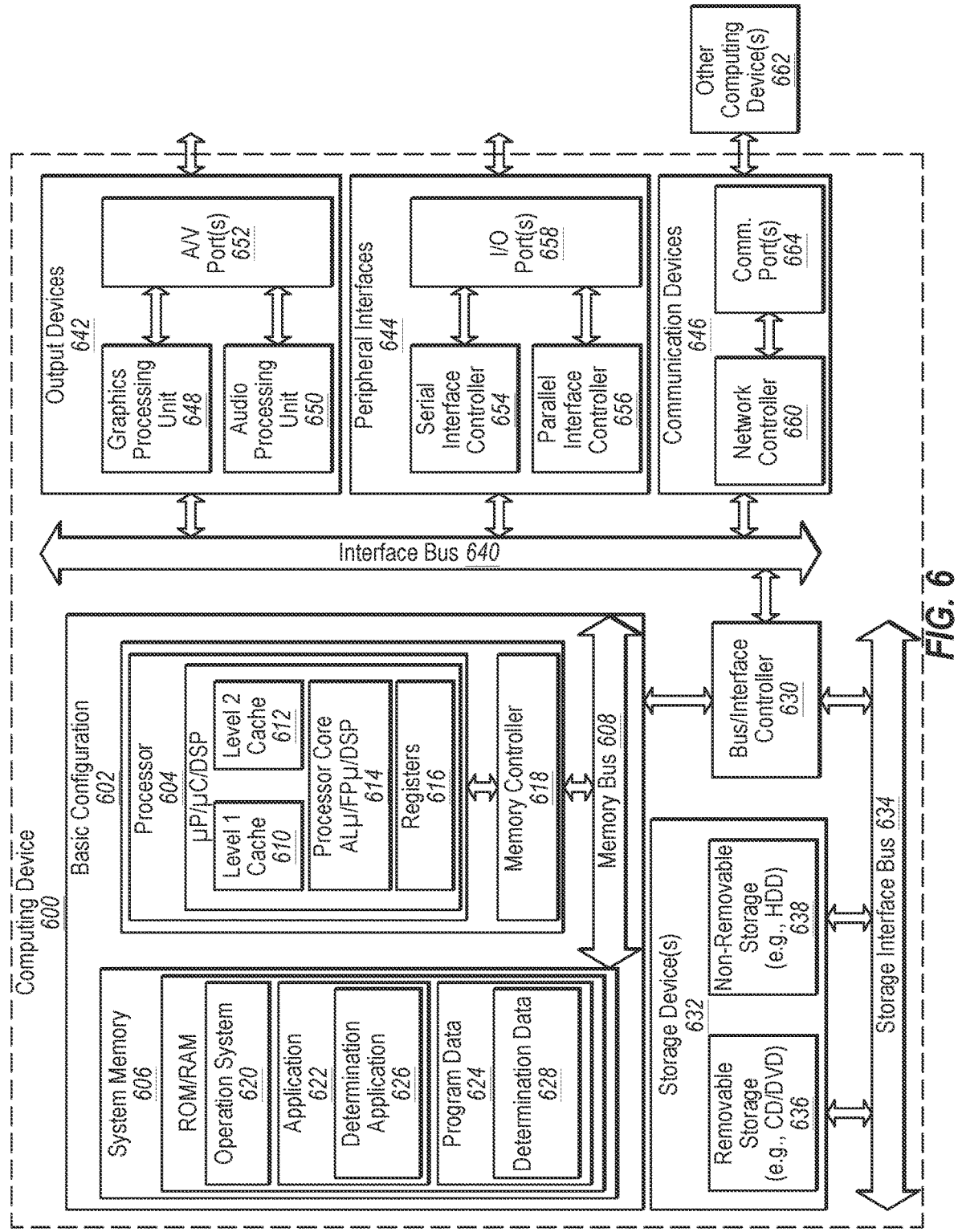
FIG. 6 shows an example computing device (e.g., a computer used as controller) that may be arranged in some embodiments to perform the control of the variable CD nozzle system and operational methods (or portions thereof) as described herein.

FIGS. 5A-5C show the controller 275 operably coupled with the actuators 500, 520 that are used for the means for changing the shape of the flexible nozzle body 16. The controller 275 and components can be operably coupled by wire, optical, wireless, etc. The controller 275 can control actuation of the actuator 500, 520 so that the components are moved to change the shape of the nozzle body 16. The controller 275 can receive input, from a user or program, to control the position of each circumferential assembly 202, such as 202a, 202b, 202c, etc. There can be any number of circumferential assemblies 202 along the body 16, such as the inlet circumferential assembly 202a, the throat circumferential assembly 202b, or outlet circumferential assembly 202c. Each circumferential assembly 202 can include a at least one articulatable member 204 (e.g., blade 304 or balloon or loop 404, etc.) that is articulated to open or close the region of the body within the aperture thereof. The controller 275 can control the position and/or aperture size of each circumferential assembly 202 to modulate the shape of the CD nozzle as described herein. The controller 274 can be a computing device 600, such as shown in FIG. 6.

For example, movement of each iris assembly 300 relative to another iris assembly 300, the bolts shown can be attached to an outer ring, which can have linear actuators spaced equidistant along the circumference at a radius outside the iris assembly 300. These actuators enable axial movements (e.g., meaning movement parallel to the centerline of the nozzle) of the iris assembly relative to each other. This stretches or relaxes the flexible nozzle body. These actuators can be linear motors, for example, as the rate of change in movement needs to be controllable and relatively fast. Also, a tangential set of actuators could control the torque (or angular movement) of each iris assembly. The separate actuators can used to control the size of the aperture in the iris assembly 300.

Figure 7:
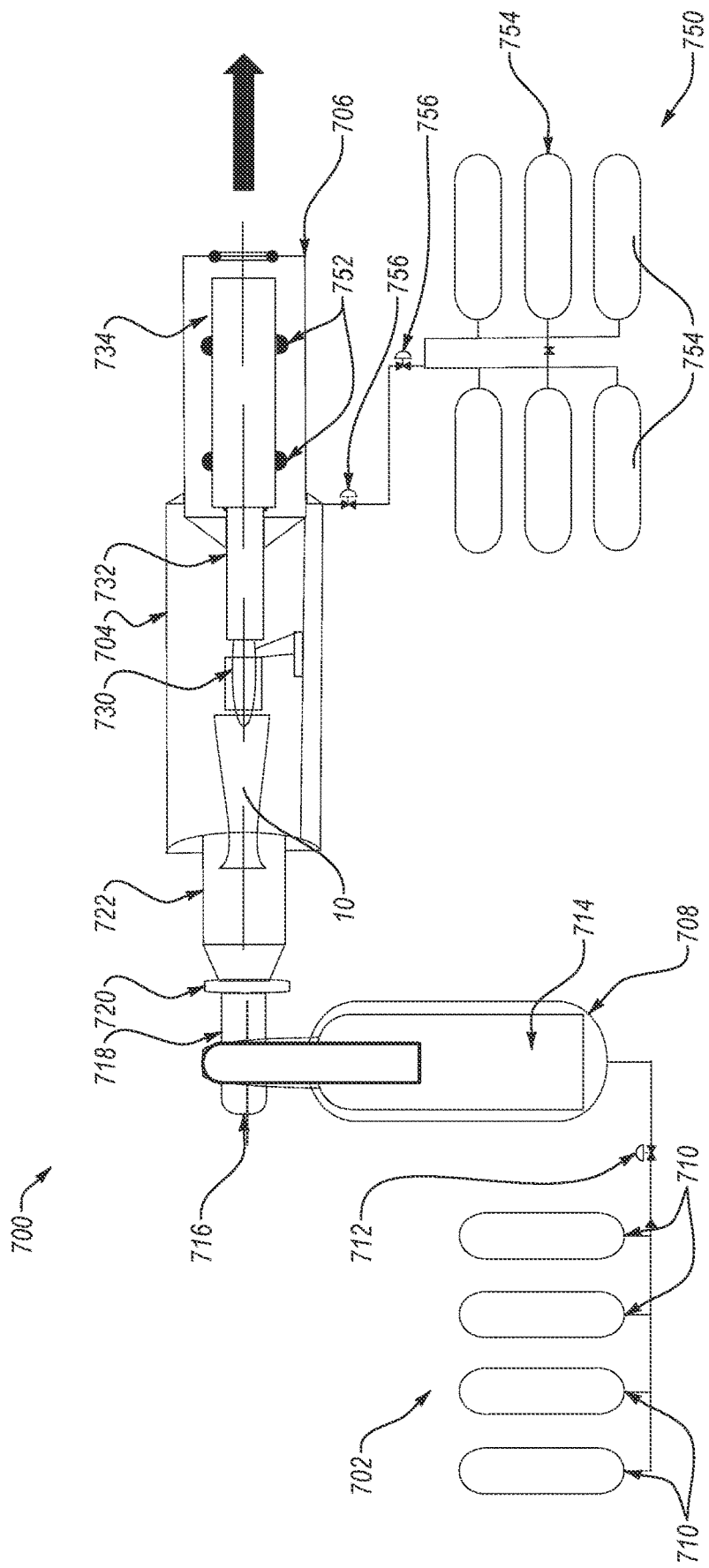
FIG. 7 shows a wind tunnel system that uses the variable CD nozzle of the embodiments described herein.
Figure 8:
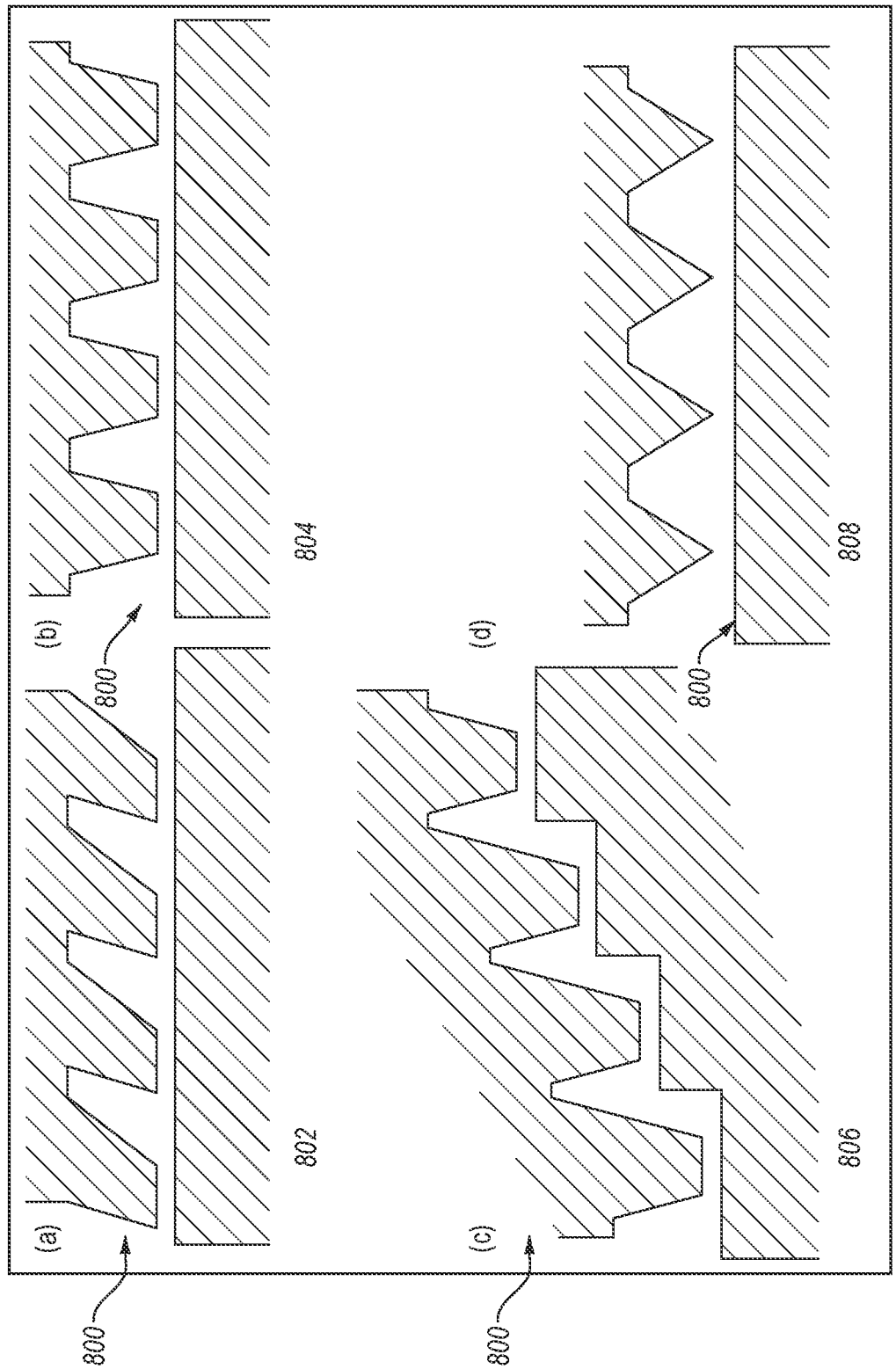
FIG. 8 shows examples of labyrinth seals that can be used at pressurized interfaces of components.

FIG. 7 shows a wind tunnel system 700 that uses the variable CD nozzle of the embodiments described herein. The wind tunnel system includes a gas supply 702 fluidly coupled with the inlet opening 20 of the nozzle 10; a test cell 704 having at least a portion of the nozzle 10 therein; and an exhaust outlet 706 fluidly coupled with the outlet opening 24 of the nozzle 10 with a test region 708 within the test cell 704 between the outlet opening 24 and exhaust diffuser 706. The gas supply 702 can include includes a gas generation system 708. The gas generation system 708 is configured for decomposing nitrous oxide to generate heat and obtain a Mach number of gas flow in the nozzle 10.

FIG. 7 shows the gas supply 702 includes primary and secondary reservoirs of $N_2O$ supply tanks 710 operably coupled to a gas supply control valve 712 that control inlet into the decomposition chamber 714 of the gas generation system 708. The $N_2O$ is decomposed as described in the incorporated provisional application and patents. The $N_2O$ is added and heated in the chamber for decomposition. The decomposition gas is passed through the rupture disks 716 and then the mixing/stilling chamber 718 before passing through the flow valve 720 into the forward adapter 722. The forward adapter 722 includes the inlet of the CD nozzle 10 which extends into the test cell 704. The test cell 704 is fluidly coupled with the forward adapter 722, and contains the CD nozzle 10 and the test article 730 downstream from the CD nozzle outlet. The test article 730 is shown between the CD nozzle 10 and the exhaust diffuser 732. The exhaust diffuser 732 is in the test cell 704, with the outlet thereof being coupled to the inlet o the ejector diffuser 734, which can include the exhaust 706.

A gas injector system 750 is included that has air injectors 752 (e.g., annular or center body) configured to inject gas (e.g., air or mixture simulating air) around the ejector diffuser 734. The air ejectors 752 inject air from high pressure air tanks 754 coupled via control valves 756 (e.g., controlled by the controller 275), which provide the pressurized air into the ejector diffuser, which is within the exhaust duct 706.

The gas supply can provide the nitrous oxide or from a source of nitrous oxide. The nitrous oxide source can comprise nitrous oxide and can be configured to introduce the nitrous oxide as a liquid and/or a gaseous composition into the chamber. The nitrous oxide can be in a liquid state, a gaseous state, or combinations thereof. The nitrous oxide can be at least 90 percent pure by volume, such as, for example, at least 95 percent pure by volume, at least 99 percent pure by volume, at least 99.9 percent pure by volume, or at least 99.99 percent pure by volume. In various examples, the nitrous oxide source can comprise a component other than nitrous oxide. For example, the nitrous oxide source can be a nitrogen oxide source. For example, the nitrogen oxide source can comprise NO, nitrous oxide ($N_2O$), $NO_2$, $N_2O_3$, $N_4O$, $N_2O_3$, $N_2O_5$, $N_4O_6$, or combinations thereof. In various examples, the nitrogen oxide can be a blend with an additional component such as for example hydrogen (e.g., to reduce the oxygen content in non-vitiated air and/or generate water vapor). The composition of the nitrogen oxide and/or blend can be configured such that non-vitiated air is generated by the system with a desired composition and at desired test conditions. The nitrous oxide can be at room temperature (e.g., 20 degrees Celsius), cooled to a temperature lower than room temperature, or heated to a temperature higher than room temperature. The nitrous oxide can be introduced into the chamber at an inlet pressure in a range of 100 psig to 10,000 psig, such as, for example, 500 psig to 3,000 psig or 750 psig to 3,000 psig. The chamber can be configured to convert the nitrous oxide from the nitrous oxide source into non-vitiated air at the desired test conditions. The conversion of the nitrous oxide into non-vitiated air can comprise a thermal decomposition, a catalytic decomposition, a shock decomposition, a combustion decomposition, or combinations thereof. For example, the nitrous oxide from the nitrous oxide source can undergo a decomposition event in the chamber.

The CD nozzle can be configured as a variable geometry, axisymmetric, three-dimensional structure. The structure can include a flexible series of interwoven elongate members (e.g., plates, ribbons, petals, etc.). The flexible members can be metal and/or flexible ceramic and/or flexible composite matrix sheets. The sheets can have a plurality of anchors integrally formed therein, which can be coupled to the actuators system. The flexible nozzle body configuration provides the ability to axially and tangentially apply forces and/or torque to change the hourglass shape of a variable flow venturi. The anchors can extend through a thickness of the interwoven plates for the nozzle body to be secured to the mechanical system. The nozzle body can be constructed with a hyperboloid structure using an array of thin elongate members at angles crossing each other in a double helical spiral configuration matrix or other weaving, braiding or the like. The flexible nozzle body defines a three-dimensional flow path having changeable cross-sections, depending on the application of forces. The cross-section has a variable area along the length of the flow path of the flexible nozzle body. The anchors can be configured to couple to at least one actuator system or other circumferential assembly that can change the circumference to change the cross-sectional area. The actuators can be is actuatable to vary the cross-section of the flow path by changing the shape of the flexible nozzle body. The flexible nozzle body can have a hyperboloid structure where the three-dimensional flow path axisymmetric and variable between at least a first cross-sectional area and a second cross-sectional area. The first cross-sectional area can include a generally axisymmetric circular cross-section. Also, the second cross-sectional area can include a generally circular cross-section of decreasing areas, followed by a series of increasing areas (e.g., the hourglass shape). The three-dimensional flow path in the flexible nozzle body includes a narrowed throat. The flexible elongate body members can include one or more cusp features. The cusp features can define a lenticular cross-section of the body. The flexible elongate body members can include one or more curved sheets, which may also include one or more side walls. The one or more curved sheets can be positioned about the one or more sidewalls, and wherein the one or more side walls and the one or more curved sheets define the three-dimensional flow path. The CD nozzle can also include an exhaust system.

The actuator systems can be configured for provide different forces to the plurality of flexible elongate nozzle body members to change the shape of the body. In some aspects, at least one actuator is configured to apply a pulling force. In some aspects, at least one actuator is configured to apply a pushing force. In some aspects, at least one actuator is configured to apply a torque force. In some aspects, at least one actuator is configured to apply a pushing force, wherein flexible elongate nozzle body members includes a thickness of a range of values in the order of millimeters, with sufficient thickness to withstand axial and radial loads on the nozzle body.

In some embodiments, the flexible elongate nozzle body members can include a flexible metal, and/or flexible ceramic, and/or flexible fiber-reinforced ceramic composite. The flexible elongate nozzle body members can be formed into a structure having a plurality of anchors integrally formed therein. The plurality of anchors extend through a thickness of the flexible materials of the nozzle body members. The flexible nozzle body members materials defines a three-dimensional axisymmetric flow path having a symmetric cross-section. The symmetric cross-section is variable along the length of the flow path by at least one actuator, which is coupled to the plurality of anchors or directly to the flexible elongate nozzle body members. Each actuator is actuatable to vary the cross-section of the flow path. The CD nozzle is configured to receive an air flow from an air source, and wherein varying the cross-section of the flow path corresponds to a change in a speed of the air flow. In some embodiments, the CD nozzle body is devoid of anchors coupled thereto or to the flexible elongate nozzle body members.

In some embodiments, a variable speed wind tunnel can include entry section configured to couple to an air source. The wind tunnel can include an exit section comprising a testing section. The CD nozzle can include a variable three-dimensional nozzle throat coupling the entry path and the exit path. The variable three-dimensional nozzle throat is configured to provide a continuously changeable air flow speed from the entry section to the exit section. The CD nozzle body can include a structure having a plurality of anchors integrally formed therein to apply axial and torque forces. The CD nozzle body includes porosity within the hyperboloid structure preform that is formed by the spaces between the flexible elongate nozzle body members. The anchors can extend tangentially and/or axially along the thickness of the flexible elongate nozzle body members. The CD nozzle body defines a three-dimensional flow path having a cross-section, and wherein the cross-section is variable along the length of the flow path. Also, at least one actuator is coupled to the plurality of anchors, wherein the at least one actuator is actuatable to vary the cross-section of the flow path and change the shape of the CD nozzle body to thereby change the airspeed of the test gas. An outer pressurized region can contain the variable CD nozzle, and extend over the entry path, the exit path, and the variable hyperboloid structure, including the axisymmetric three-dimensional throat. The variable hyperboloid structure three-dimensional throat provides a capability of a continuously changing air flow speed from a first speed to a second speed, or being capable of being fixed at the first speed and then the second speed during operation of the wind tunnel. In some aspects, the first speed is about Mach 2 to 3 and the second speed is about Mach 8 or higher.

In some embodiments, the porosity of the flexible CD nozzle body allows for the barrier gas to be passed therethrough into the test gas flow path. The barrier gas can be introduced in an amount sufficient to provide a simulated smooth surface from the barrier gas layer. In an example, the entire nozzle exterior can be pressurized with nitrogen or other gas, which will permeate the pores in the flexible CD nozzle body at a specified rate (e.g., as a function of pressure and mesh porosity), causing a gas barrier layer to form on the interior wall of the nozzle body. The gas barrier layer can serve to create an artificial gas interface that of a gaseous boundary layer inside the nozzle approximating a smooth surface. The barrier gas can also act as a potential cooling source if hot gasses passing through the nozzle are potentially impacting the integrity of the nozzle body or the circumferential assemblies (e.g., iris mechanisms, loop mechanism, actuators, etc.).

The CD nozzle embodiments described herein can be used in methods for changing airflow in a nozzle and for testing an object with gas flow provided by the CD nozzle. The CD nozzle can be operated with the wind tunnel system described herein.

In some embodiments, a method of changing airflow in a nozzle can include providing the nozzle and operating the at least one means for changing the shape of the flexible body to change the dimension or the location of the throat plane relative to at least one of the inlet plane or outlet plane of the nozzle. The nozzle can be operated to change the shape of the nozzle as described herein, where the actions and articulations are included in the methods. The nozzle body can change shape by articulations that move the flexible members relative to each other, such as to narrow or widen the nozzle throat, or move location of the nozzle throat relative to the inlet and outlet. The inlet can also be manipulated, which is usually only having a circumferential change that modifies the inlet cross sectional area. The outlet can be manipulated to change the area of the opening or move the outlet closer or further away from the nozzle throat. The method can also include modulating the inlet gas flow in order to change the airflow. The change of the airflow and/or shape of the CD nozzle can be performed during operation, such as testing a plane design. The method can also include modulating the glow rate of the barrier gas that is introduced through the body apertures between the body parts (e.g., elongate flexible members). The thickness of the barrier gas between the test gas and an internal surface of the body flow path can be modulated by modulating the barrier gas flow rate.

A method of testing an object can include providing a wind tunnel that includes the CD nozzle with a downstream test cell. The method can include placing a test object in the test region of the test cell. Then, the method can include passing a test gas from the outlet opening of the nozzle onto the test object. The properties of the test object can then be assessed, such as with thermocouples or other temperature testing device testing temperature at various locations on the test object, such as fuselage, wings, aviators, rudders, ailerons, or the like. The airflow past the test object and any changes imparted to the airflow from the test object can be monitored and analyzed.

The methods can include steps for operating the means for changing the shape of the flexible body to change the dimension or the location of the throat plane relative to at least one of the inlet plane or outlet plane to change at least one property of the test gas at the test object. In some aspects, the at least one property includes test gas velocity, temperature, corresponding Mach number, and core flow uniformity.

In some aspects, the flexible body includes apertures between the plurality of flexible members that are movably interconnected together. Accordingly, the method can include injecting a barrier gas through the apertures into the flow path so as to form a barrier gas layer between the test gas and the flexible body. The barrier gas initially stays at the internal surface of the body but will dissipate into the test gas flow. However, the plurality of apertures down the length of the body provide for a barrier layer from the inlet to the outlet.

In some embodiments, the means for changing the shape of the flexible body includes at least one circumferential assembly that has at least one articulatable member that defines an aperture having an aperture plane with a variable area when articulated. Accordingly, the method can include passing the test gas from the outlet opening to have a first parameter profile. Then, the method can include articulating the at least one articulatable member to change the variable area of the aperture plane. The method can then include passing the test gas from the outlet opening to have a second parameter profile that is different from the first parameter profile in at least one parameter. That is, the nozzle changes the nature of the test gas, and operation of the nozzle to change the shape thereof changes the test gas profile going out the outlet.

In some embodiments, the method can include moving the throat plane relative to the inlet opening and outlet opening. The movement of the position of the throat plane can be performed with the longitudinal actuator as described herein. Other circumferential assemblies can also be moved longitudinally during operation of the wind tunnel in order to change the shape of the body of the CD nozzle. In some embodiments, the shape of the CD nozzle is varied to vary the area of at least the throat plane and the outlet plane, which can vary the area ratio between the nozzle and outlet areas.

In some embodiments, the configuration of the CD nozzle includes the elongate members that make up the body thereof. For this type of CD nozzle to hold its shape, and simultaneously have the ability to change the dimensions of the throat area and the exit area (in addition to the inlet area), there can be a structural accommodation of forces resulting from the pressure differential outside the nozzle body to those inside the nozzle flow path such that the area remains constant at each cross-sectional profile while airflow is being passed through the nozzle. The body can include the flexible members associated together in a cloth-like form to form the shape of the nozzle. The flexible members provide the CD nozzle body with an inherent flexibility. If the flexibility is such that the pressure differential can cause a range of motion in a joint or group of joints or influences the ability to move joints by moving the elongate member and therefore a resulting change in overall axial and/or radial dimensions, the flexibility can be stiff enough such that pressure changes do not result in causing deflections in the members. The flexibility is sufficient such that the range of motion appreciably changes the dimensions of the nozzle, but resilient enough to maintain the shape during use. The difference of pressures between the inside of the nozzle flow path and the exterior of the nozzle (e.g., in the cavity in the housing) can be balanced by an overall exterior pressure modulation to counter the internal pressure.

Alternatively, the body of the nozzle can stay in a fixed shape by a series of localized pressure regions separated by labyrinth seals. Labyrinth seals 800 are shown in FIG. 8, which can be slanted 802, straight flat 804, stepped, 806, and straight sharp 808. The labyrinth seals can be used at various locations to control the rate of gas leakage at an interface. For example, the iris assembly can have a seal with the internal surface of the outer housing, such as around the perimeter of the iris assembly at the interface with the internal surface of the housing. Depending on the surface features caused by the weave of the elongate flexible members that make up the CD nozzle body or the fabric formed by the elongate flexible members on the exterior of the nozzle, and considering the adjacent area pitch of the nozzle, various types of labyrinth seals could be utilized with the elongate members that form the body. With the labyrinth seals there is controlled flow and/or leakage at one of more of a segmented region at an intersection of two elongate flexible members that form the body. The intersection allows for axial and/or radial movement of the bottom surfaces in the case of a CD shaped nozzle, which then balances the structural integrity of the nozzle region formed by the bottom surfaces. The labyrinth seal can be used at any movable interface between two surfaces of two different components.

The body of the CD nozzle includes an inherent porosity formed by the apertures or slit apertures between adjacent flexible members of the nozzle body. The porosity from the outside to the inside of the nozzle flow path allows for an application of an exterior pressure of a barrier gas that can be utilized where it is desirable for the barrier gas to permeate to the inside of the nozzle into the flow path. The gas can provide a counter pressure to the test gas in the flow path, and also cause a secondary effect such as the cooling of the CD nozzle body. The layer of barrier gas provides a simulated smooth surface. That is, the gas provides a layer that simulates a smooth surface for the test gas passing through the nozzle flow path. The gas can function as a thin film boundary layer, but is composed of the barrier gas. While the surface of the flexible nozzle body can be rough, uneven, or have variations due to the different flexible elongate nozzle body members and intersections thereof and slit apertures formed thereby, the barrier gas passes through the slit apertures and forms the barrier gas layer to simulate a smooth internal surface on the flexible nozzle body.

In some embodiments, the configuration of the flexible elongate nozzle body members with the external pressurized barrier gas (e.g., higher pressure than within nozzle flow path) allows for cooling, such as transpiration. The external pressurization of the nozzle body can help hold the shape and provide the barrier gas to the external surface of the nozzle body and individual flexible elongate body members, between the flexible elongate body members, and into the flow path so as to be pushed against the internal surface of the nozzle body and individual body members. The barrier gas flow rate can be adjusted to inhibit the heat from the test gas from overheating or damaging the nozzle body or individual body members. Often, the barrier gas is nitrogen or other non-reactive gas that does not interact with the substances of the test gas, such as argon, helium, or the like.

In some embodiments, methods of operation include measuring mass flow through the nozzle and into the test area of the test cell. The mass flow can be from the test gas passing into the nozzle inlet and from the pressurized boundary gas that penetrates through the flexible nozzle body (e.g., between the nozzle body members). As a result, the mass of barrier gas being introduced into the nozzle flow path can be recorded for use in subsequent calculations. The mass of the barrier gas introduced into the nozzle flow path can be subtracted from the known mass of the test gas (e.g., mass flow rates).

In some embodiments, the test gas provided to the variable nozzle flow path can be non-vitiated air. The phrase "non-vitiated air" as used herein refers to a gas composition that is substantially free of contaminates (e.g., carbon-based particulate) and comprises a composition substantially similar to atmospheric air. In general, it has been found that vitiation contamination has a profound effect on vibrational relaxation, combustion kinetics, condensation and overall test engine performance. The non-vitiated air can be substantially similar to atmospheric air. The phrase "substantially similar to atmospheric air" means the non-vitiated air composition can comprise 10 percent to 45 percent oxygen gas, 55 percent to 90 percent nitrogen gas, and 0 percent to 5 percent of other components, such as, for example, argon, carbon dioxide, neon, helium, and water vapor, all on a volume basis. For example, the non-vitiated air composition can comprise 15 percent to 35 percent oxygen gas, 65 percent to 85 percent nitrogen gas, and 0 percent to 5 percent of other components, all on a volume basis. In various examples, a non-vitiated air composition can comprise 18 percent to 24 percent oxygen gas and 76 percent to 82 percent nitrogen gas, all on a volume basis. For example, the non-vitiated air can comprise 21 percent oxygen gas, 78 percent nitrogen gas, and 1 percent of other components, all on a volume basis. The non-vitiated air composition can comprise diatomic and homonuclear oxygen gas and nitrogen gas. Non-vitiated air may not be vitiated air. The non-vitiated air generated by the chamber can comprise desired test conditions, such as, for example, a desired test speed, a desired test composition, a desired test pressure, and a desired test temperature. The desired test speed can be in a range of Mach 1 to Mach 20, such as, for example, Mach 2 to Mach 10, Mach 3 to Mach 7, or Mach 5 to Mach 10. As used herein, the term "Mach" refers to the velocity of an object relative to the speed of sound (e.g., Mach 1=one times the speed of sounds, Mach 2=two times the speed of sound). The desired test pressure can be in a range of 0.1 psia to 50 psia, such as, for example, 1 psia to 30 psia or 1 psia to 14.6 psia. The desired test temperature can be in a range of 1,000 degrees Fahrenheit to 4,000 degrees Fahrenheit, such as, for example, 2,000 degrees Fahrenheit to 4,000 degrees Fahrenheit or 2,500 degrees Fahrenheit to 4,000 degrees Fahrenheit.

The test chamber having the nozzle and test area can be configured to receive a device to be tested and subject the device to non-vitiated air from the system for generation of non-vitiated air at the desired test conditions. The device can be a HS/H device, such as, for example, an aerospace vehicle or component. For example, the device can be a ram jet, a scram jet, a ducted rocket, a thermal protection system material, a HS/H jet, a drone, a weapons system, an engine, an engine component (e.g., a compressor blade, an isolator, a combustor), a heat exchanger, or combinations thereof.

One skilled in the art will appreciate that, for the processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In one embodiment, the present methods can include aspects performed on a computing system. As such, the computing system can include a memory device that has the computer-executable instructions for performing the methods. The computer-executable instructions can be part of a computer program product that includes one or more algorithms for performing any of the methods of any of the claims.

In one embodiment, any of the operations, processes, or methods, described herein can be performed or cause to be performed in response to execution of computer-readable instructions stored on a computer-readable medium and executable by one or more processors. The computer-readable instructions can be executed by a processor of a wide range of computing systems from desktop computing systems, portable computing systems, tablet computing systems, hand-held computing systems, as well as network elements, and/or any other computing device. The computer readable medium is not transitory. The computer readable medium is a physical medium having the computer-readable instructions stored therein so as to be physically readable from the physical medium by the computer/processor.

There are various vehicles by which processes and/or systems and/or other technologies described herein can be effected (e.g., hardware, software, and/or firmware), and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The various operations described herein can be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware are possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a physical signal bearing medium include, but are not limited to, the following: a recordable type medium such as a floppy disk, a hard disk drive (HDD), a compact disc (CD), a digital versatile disc (DVD), a digital tape, a computer memory, or any other physical medium that is not transitory or a transmission. Examples of physical media having computer-readable instructions omit transitory or transmission type media such as a digital and/or an analog communication medium (e.g., a fiber optic cable, a waveguide, a wired communication link, a wireless communication link, etc.).

It is common to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems, including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. Such depicted architectures are merely exemplary, and that in fact, many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include, but are not limited to: physically mateable and/or physically interacting components and/or wirelessly interactable and/or wirelessly interacting components and/or logically interacting and/or logically interactable components.

FIG. 6 shows an example computing device 600 (e.g., a computer) that may be arranged in some embodiments to perform the methods (or portions thereof) described herein. In a very basic configuration 602, computing device 600 generally includes one or more processors 604 and a system memory 606. A memory bus 608 may be used for communicating between processor 604 and system memory 606.

Depending on the desired configuration, processor 604 may be of any type including, but not limited to: a microprocessor (μP), a microcontroller (μC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations, memory controller 618 may be an internal part of processor 604.

Depending on the desired configuration, system memory 606 may be of any type including, but not limited to: volatile memory (such as RAM), non-volatile memory (such as ROM, flash memory, etc.), or any combination thereof. System memory 606 may include an operating system 620, one or more applications 622, and program data 624. Application 622 may include a determination application 626 that is arranged to perform the operations as described herein, including those described with respect to methods described herein. The determination application 626 can obtain data, such as pressure, flow rate, and/or temperature, and then determine a change to the system to change the pressure, flow rate, and/or temperature.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include: magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include: volatile and non-volatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to: RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. The computing device 600 can also be any type of network computing device. The computing device 600 can also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In some embodiments, a computer program product can include a non-transient, tangible memory device having computer-executable instructions that when executed by a processor, cause performance of a method that can include: providing a dataset having object data for an object and condition data for a condition; processing the object data of the dataset to obtain latent object data and latent object-condition data with an object encoder; processing the condition data of the dataset to obtain latent condition data and latent condition-object data with a condition encoder; processing the latent object data and the latent object-condition data to obtain generated object data with an object decoder; processing the latent condition data and latent condition-object data to obtain generated condition data with a condition decoder; comparing the latent object-condition data to the latent-condition data to determine a difference; processing the latent object data and latent condition data and one of the latent object-condition data or latent condition-object data with a discriminator to obtain a discriminator value; selecting a selected object from the generated object data based on the generated object data, generated condition data, and the difference between the latent object-condition data and latent condition-object data; and providing the selected object in a report with a recommendation for validation of a physical form of the object. The non-transient, tangible memory device may also have other executable instructions for any of the methods or method steps described herein. Also, the instructions may be instructions to perform a non-computing task, such as synthesis of a molecule and or an experimental protocol for validating the molecule. Other executable instructions may also be provided.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more");

the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

All references recited herein are incorporated herein by specific reference in their entirety, especially the subject matter relating to CD nozzles, and the systems and operating environments thereof.

References: WO 2020/210179; U.S. Pat. Nos. 6,606,851; 6,779,335; 8,459,036; 9,470,603; 9,598,323; 10,738,735; "Modeling of N2O Decomposition Events" by Arif Karabeyoglu, Jonny Dyer, Jose Stevens, and Brian Cantwell. 44th AIAA/ASME/SAE/ASEE Joint Propulsion Conference & Exhibit, Joint Propulsion Conferences.

The invention claimed is:

1. A variable three-dimensional (3D) convergent-divergent (CD) nozzle, the nozzle comprising:
a flexible body defining an axisymmetric flow path, with a lateral cross-sectional profile of a circle, having an inlet opening with an inlet plane extending through a narrowed throat with a throat plane to an expanded outlet opening with an outlet plane, wherein the flexible body comprises a plurality of flexible members movably interconnected together, wherein the flexible body, inlet opening, throat, and outlet opening each have an axisymmetric circular cross-sectional profile when in an expanded state and a contracted state with expansion or contraction of the axisymmetric circular cross-sectional profile being independent relative to the axisymmetric flow path; and
at least one means for changing a shape of the flexible body to change;
a dimension of the axisymmetric circular cross-sectional profile between the expanded state and the contracted state; or
a location of the throat plane with the axisymmetric circular cross-sectional profile relative to at least one of the inlet plane or outlet plane.

2. The nozzle of claim 1, wherein the plurality of flexible members are movably interconnected together by a movable interlace, interweave, intertwine, plait, entwine, cross-cross, weave, knit, lace twist, or wind to form the flexible body.

3. The nozzle of claim 1, wherein the plurality of flexible members include a cord, thread, string, strap, tape, line, rope, cable, wire, ligature, twine, yarn, ribbon, strip, fiber, filament, petal, sheet, or combinations thereof, or interlace, interweave, intertwine, plait, entwine, cross-cross, weave, knit, lace twist, or wind thereof for each flexible member, wherein the plurality of flexible members form a hyperboloid shape with the lateral cross-sectional profile of the circle of the flexible body in the expanded state and contracted state.

4. The nozzle of claim 1, wherein the flexible body includes a plurality of apertures between and defined by the plurality of flexible members that are movably interconnected together, wherein each aperture varies when the shape of the flexible body changes between the expanded state and contracted state.

5. The nozzle of claim 4, further comprising a fluid-tight housing having an internal chamber that contains the flexible body, wherein the flexible body has a hyperboloid shape.

6. The nozzle of claim 5, further comprising:
at least one gas inlet valve in the housing to provide pressurized barrier gas to the internal chamber; and
a gas system for introducing gas through the inlet valve into the housing at a position exterior to the flexible body so that the gas flows through the apertures into the flow path,
wherein a barrier gas layer at an internal lumen surface of the flexible body is formed from the gas.

7. The nozzle of claim 6, further comprising at least one pump operably coupled to the at least one gas inlet valve to provide a barrier gas supply as the pressurized barrier gas to the internal chamber,
wherein the barrier gas layer forms a smooth internal interface in the flow path.

8. The nozzle of claim 1, wherein the at least one means for changing the shape of the flexible body includes at least one circumferential assembly around the flexible body that has at least one articulatable member that defines an aperture having an aperture plane with a variable area when articulated.

9. The nozzle of claim 8, wherein the at least one circumferential assembly includes an iris assembly having a driving plate with a plurality of blades rotatably mounted to a circumferentially rotating assembly.

10. The nozzle of claim 9, wherein each blade is fixedly mounted to a gear member, and each gear member is rotatably mounted to a gear plate.

11. The nozzle of claim 9, wherein the at least one means for changing the shape of the flexible body includes a first actuator that actuates the iris assembly to change the variable area of the aperture plane with the plurality of blades.

12. The nozzle of claim 9, wherein the at least one means for changing the shape of the flexible body includes a second actuator that actuates the iris assembly in a longitudinal direction of the flexible body.

13. The nozzle of claim 8, wherein the at least one circumferential assembly includes at least one adjustable loop assembly having an elongate member formed into a loop with an adjustment mechanism.

14. The nozzle of claim 13, wherein the loop of the elongate member defines the aperture having the aperture plane.

15. The nozzle of claim 13, wherein the at least one means for changing the shape of the flexible body includes a first actuator that actuates the at least one adjustable loop assembly to change the variable area of the aperture plane by varying the size of the loop.

16. The nozzle of claim 15, wherein the first actuator pulls and/or pushes the elongate member relative to the adjustment mechanism to make the change in the variable area of the aperture plane.

17. The nozzle of claim 13, wherein the at least one means for changing the shape of the flexible body includes a second actuator that actuates the at least one adjustable loop assembly in a longitudinal direction of the flexible body.

18. The nozzle of claim 8, wherein the at least one means for changing the shape of the flexible body includes a first actuator that actuates the at least one circumferential assembly to change the variable area of the aperture plane, wherein the variable area of the aperture plane is circular.

19. The nozzle of claim 18, wherein the first actuator includes at least a first motor and a first articulating arm.

20. The nozzle of claim 8, wherein the at least one means for changing the shape of the flexible body includes a second actuator that actuates the at least one circumferential assembly in a longitudinal direction of the flexible body.

21. The nozzle of claim 1, further comprising a controller operably coupled with the means for changing the shape of the flexible body.

22. A wind tunnel comprising:
the nozzle of claim 1;
a gas supply fluidly coupled with the inlet opening of the nozzle;
a test cell having at least a portion of the nozzle therein; and
an exhaust outlet fluidly coupled with the outlet opening of the nozzle with a test region within the test cell between the outlet opening and exhaust diffuser.

23. The wind tunnel of claim 22, wherein the gas supply includes a gas generation system.

24. The wind tunnel of claim 23, wherein the gas generation system is configured for decomposing nitrous oxide to generate heat and obtain a Mach number of gas flow in the nozzle.

25. A method of testing an object, comprising:
providing the wind tunnel of claim 22;
placing a test object in the test region of the test cell; and
passing a test gas from the outlet opening of the nozzle onto the test object.

26. The method of claim 25, further comprising operating the at least one means for changing the shape of the flexible body to change at least one of:
the dimension of the axisymmetric circular cross-sectional profile between the expanded state and the contracted state; or
the location of the throat plane with the axisymmetric circular cross-sectional profile relative to at least one of the inlet plane or outlet plane to change at least one property of the test gas at the test object.

27. The method of claim 26, wherein the at least one property includes at least one of test gas velocity, temperature, corresponding Mach number, and core flow uniformity.

28. The method of claim 25, wherein the flexible body includes apertures between the plurality of flexible members that are movably interconnected together, the method further comprising injecting a barrier gas through the apertures into the flow path so as to form a barrier gas layer between the test gas and the flexible body, wherein the barrier gas layer extends around an internal lumen surface of the flexible body along a length of the flow path and forms a smooth internal interface in the flow path.

29. The method of claim 25, wherein the at least one means for changing the shape of the flexible body includes at least one circumferential assembly that has at least one articulatable member that defines an aperture having an aperture plane with a variable area when articulated, the method comprising:
passing the test gas from the outlet opening to have a first parameter profile;
articulating the at least one articulatable member to change the variable area of the aperture plane of the axisymmetric circular cross-sectional profile between the expanded state and the contracted state; and
passing the test gas from the outlet opening to have a second parameter profile that is different from the first parameter profile in at least one parameter.

30. The method of claim 29, further comprising moving the throat plane longitudinally relative to the inlet opening and outlet opening.

31. A method of changing airflow in a nozzle, comprising:
providing the nozzle of claim 1; and
operating the at least one means for changing the shape of the flexible body to change;
the dimension of the axisymmetric circular cross-sectional profile between the expanded state and the contracted state; or
the location of the throat plane with the axisymmetric circular cross-sectional profile relative to at least one of the inlet plane or outlet plane.

* * * * *